(12) United States Patent
Ito et al.

(10) Patent No.: US 8,157,454 B2
(45) Date of Patent: Apr. 17, 2012

(54) RELEASABLE LOCKING MECHANISM FOR OPTICAL CONNECTOR

(75) Inventors: Toshiyasu Ito, Togane (JP); Hiromasa Tanobe, Atsugi (JP); Yoshihisa Sakai, Atsugi (JP); Masaru Kobayashi, Atsugi (JP); Ryo Nagase, Atsugi (JP)

(73) Assignees: Yamaichi Electronics Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 450 days.

(21) Appl. No.: 12/523,839

(22) PCT Filed: Feb. 1, 2008

(86) PCT No.: PCT/JP2008/051687
§ 371 (c)(1),
(2), (4) Date: Jul. 20, 2009

(87) PCT Pub. No.: WO2008/096684
PCT Pub. Date: Aug. 14, 2008

(65) Prior Publication Data
US 2010/0014813 A1    Jan. 21, 2010

(30) Foreign Application Priority Data
Feb. 5, 2007   (JP) .................. 2007-026034

(51) Int. Cl.
*G02B 6/36* (2006.01)
(52) U.S. Cl. .............. 385/53; 385/56; 385/58; 385/136; 385/137

(58) Field of Classification Search .................. 385/53, 385/56, 58, 137–138
See application file for complete search history.

(56) References Cited

U.S. PATENT DOCUMENTS

| | | | |
|---|---|---|---|
| 6,821,031 B2 * | 11/2004 | Loch et al. ................ | 385/92 |
| 6,887,092 B2 | 5/2005 | Minota | |
| 7,625,134 B2 * | 12/2009 | Pitwon et al. ............... | 385/88 |
| 2006/0275011 A1 * | 12/2006 | Tourne ..................... | 385/136 |
| 2007/0154160 A1 * | 7/2007 | Tourne ..................... | 385/136 |
| 2007/0286558 A1 * | 12/2007 | Loch et al. ................. | 385/92 |

FOREIGN PATENT DOCUMENTS

| | | |
|---|---|---|
| JP | 3432394 | 5/2003 |
| JP | 2004-170594 | 6/2004 |
| JP | 3566881 | 6/2004 |
| JP | 2006-337727 | 12/2006 |

* cited by examiner

*Primary Examiner* — Brian M. Healy
*Assistant Examiner* — Guy Anderson
(74) *Attorney, Agent, or Firm* — Finnegan, Henderson, Farabow, Garrett & Dunner, LLP

(57) ABSTRACT

A receptacle (20) detachably accommodating a connector plug (34) connected to optical fibers (32) is rotatably supported by a shaft (14) provided in an installation table (10). The receptacle (20) is biased by a leaf spring (16) for biasing opposite ends of the shaft (14) in one direction. A locking/unlocking mechanism for selectively locking or unlocking the receptacle (20) connected with the connector plug (34) relative to the installation table (10) and a locking mechanism fixing portion (12) includes a locking nib (30Ra) of a lock releasing button (30R), a locking nib (30La) of a lock releasing button (30L), locking nib receiving portions (12na, 12nb) and a coil spring (31).

15 Claims, 23 Drawing Sheets

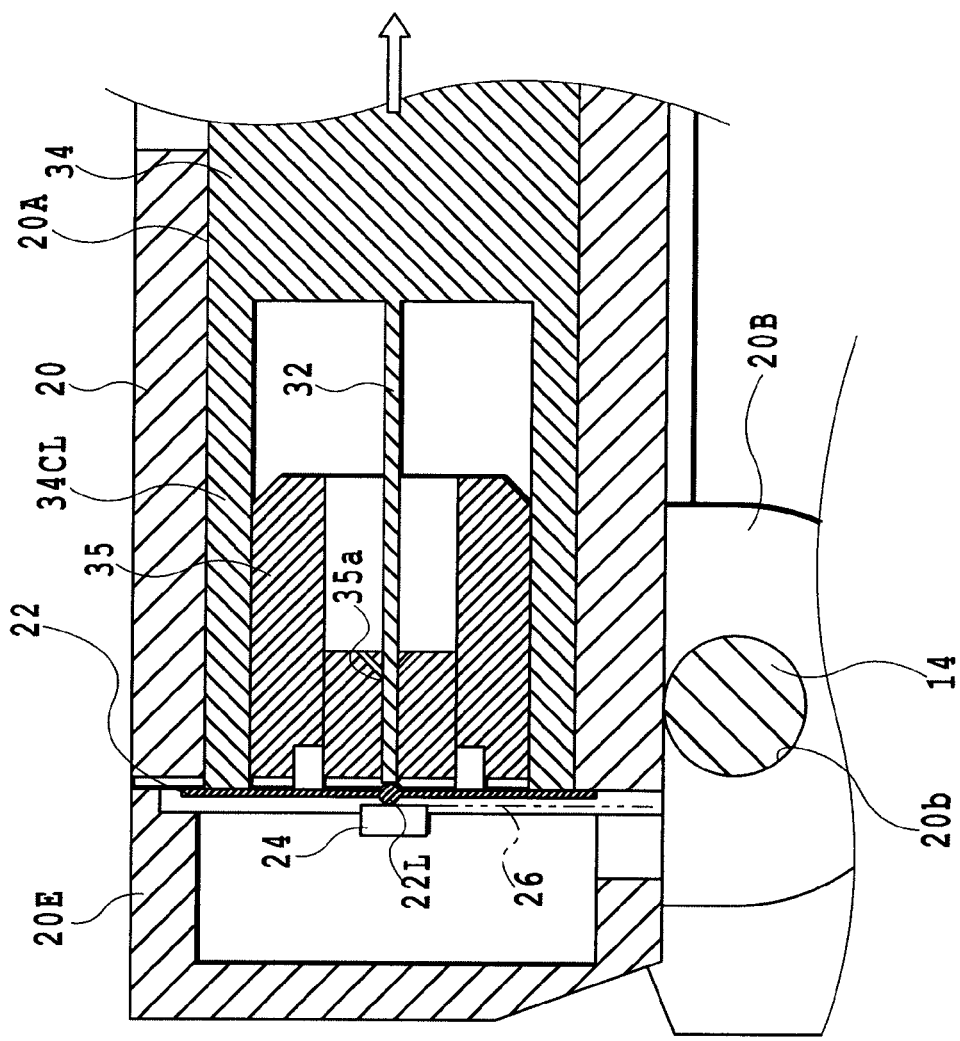

RELEASABLE LOCKING MECHANISM FOR OPTICAL CONNECTOR

TECHNICAL FIELD

The present invention relates to a releasable locking mechanism for an optical connector including connector plugs and receptacle.

BACKGROUND ART

Optical fibers used as a transmission path in an optical communication system are connected to each other by optical connectors as disclosed in Patent Document Nos. 1 and 2. The optical connectors put into practice are an MT (Mechanically Transferable) type optical connector as disclosed in Patent Document No. 1, an MPO (Multi-fiber Push On) type optical connector as disclosed in Patent Document No. 2 or others, for example.

The MT type optical connector includes, as main elements, a first connector plug connected to one group of optical fibers, a second connector plug connected to the other group of optical fibers and a locking mechanism for holding the first connector plug and the second connector plug, while positioning connection end surfaces of the respective optical fibers projected from end surfaces of ferrules of the respective connector plug to each other so that the connection end surfaces are brought into contact or close to each other.

The locking mechanism is required to hold the first and second connector plugs in a state wherein the connection end surfaces of the respective group of optical fibers are brought into contact or close to each other so that the transmission efficiency and the optical connection characteristics are favorably maintained.

As a locking mechanism, for example, as shown in Patent Document No. 1, a clamp spring disposed while straddling over the first and second connector plugs connected each other as a whole is proposed. The clamp spring is formed in a flat plate shape, having curved pressed portions at positions corresponding to rubber boots of the first and second connector plugs at a predetermined distance therebetween. The pressed portions bias the rubber boots of the first and second connector plugs in the direction that come close to each other by the resilience of the pressed portions.

When the clamp spring is mounted on the first connector plug and the second connector plug connected to each other, the first connector plug and the second connector plugs are forcibly pushed into a gap between pressing portions of the clamp spring opposed to each other against the elastic force of the pressing portions. Thereby, the clamp spring biases the end portions of the first connector plug and the second connector plug encircled by the rubber boots so that the ferrules of the first connector plug and the second connector plug opposed to each other move closer to each other in an axial direction of the optical fibers. Accordingly, the first connector plug and the second connector plug are in a locked state while keeping the connection ends surfaces of the respective groups of optical fibers being brought into contact or close to each other.

On the other hand, when the clamp spring is detached from the first connector plug and the second plug connected to each other, the clamp spring is forcibly separated from the first connector plug and the second connector plug against the frictional force caused by the elastic force of the respective pressed portions.

Patent Document No. 1: Japanese Patent Gazette No. 3566881

Patent Document No. 2: Japanese Patent Gazette No. 03432394

DISCLOSURE OF THE INVENTION

In a case wherein the locking mechanism is structured by the above-mentioned clamp spring, if the optical fibers are pulled against the elastic force of the pressed portion of the clamp spring with a pull force exceeding a predetermined value defined to be larger than the pressing force applied to the pressed portion, in the direction wherein the first connector plug and the second connector plug are apart from each other for any reason, there may be a risk in that the connection end surfaces of the respective group of optical fibers are apart from each other to result in the transmission loss and the deterioration of the optical connection characteristics. In such a case, it may be thought to thicken a sheet thickness of the pressed portion of the clamp spring so that the pressure of the respective pressed portion becomes higher than the predicted pulling force.

However, when the operator mounts/demounts the clamp spring to/from the first connector plug and the second connector plug to be connected to the clamp spring, it is difficult for the operator to mount/demount the clamp spring while gripping the first connector plug and the second connector plug as well as the plate-like clamp spring by his or her both hands, whereby this countermeasure is inadvisable.

By taking such a problem into consideration, the present invention aims to provide a releasable locking mechanism for optical fibers including connector plugs and receptacle capable of avoiding the relative movement of the connector plugs and the connection end surfaces of the optical fibers even if a pull force is applied to the group of optical fibers in the axial direction thereof for any reason, whereby it is possible to prevent the connection end surfaces of the respective optical fibers from separating from each other as well as to easily operate the locking mechanism.

To achieve the above-mentioned object, a releasable locking mechanism for optical fibers according to the present invention comprises a lock releasing button having a lock-fixing portion and movably disposed in either one of a receptacle or a base disposed opposite to the receptacle, the receptacle having a connector plug accommodation portion for detachably accommodating a connector plug, the connector plug being connected to optical fibers to form a transmission path for photoelectric converted signals, a locking nib receiving portion formed opposite to the lock releasing button in either one of said receptacle or said base, for selectively fixing the lock-fixing portion to result in a locked state of the receptacle and the connector plug relative to the base, a first biasing member for biasing a locking nib of the lock releasing button in direction that fix it to the locking nib receiving portion, a position restricting surface for touching and holding an end of the connector plug mounted to said connector plug accommodation portion in the locked state, and a second biasing member for biasing the receptacle in the axial direction of said optical fibers when an end of the connector plug mounted to the connector plug accommodation portion is retained by the position restricting surface.

Also, a releasable locking mechanism for an optical connector according to the present invention comprises a lock releasing button having a lock-fixing portion and movably disposed in either one of a receptacle or a base disposed opposite to the receptacle the receptacle having a connector plug accommodation portion for detachably accommodating a connector plug being connected to optical fibers to form a transmission path for photoelectric converted signals, a locking nib receiving portion formed opposite to the lock releasing button in either one of said receptacle or said base, for selectively fixing the lock-fixing portion to result in a locked state of said receptacle and the connector plug relative to the base, a first biasing member for biasing a locking nib of the lock releasing button in direction that fix it to the locking nib receiving portion, a position restricting member disposed in the base, for restricting the position of a predetermined end of the connector plug mounted to the connector plug accommodation portion when the connector plug is in the locked state, and a second biasing member for biasing ends of the connector plug and the optical fibers toward the bottom of the connector plug accommodation portion in the axial direction of the optical fibers when the position of the end of the connector plug is restricted by the position restricting member.

As apparent for the above description, in the releasable locking mechanism for the optical connector according to the present invention, since the second biasing member biases the receptacle in the axial direction of the optical fibers when the end of the connector plug mounted to the connector plug accommodation portion is held by the position restricting surface, the mutual displacement of the connector plug and the connecting end surface of the optical fiber is inhibited even if a stretching force is applied to the optical fibers in the axial direction thereof by any cause, whereby the separation of the connecting ends of the respective optical fibers is avoidable. Further, it is possible to easily operate the locking mechanism by the movement of the lock releasing button.

BRIEF DESCRIPTION OF THE DRAWINGS

FIG. 5 is an enlarged partial sectional view of part of a receptacle and a connector plug in an embodiment shown in FIG. 2;

BEST MODE FOR CARRYING OUT THE INVENTION

Figure 2:
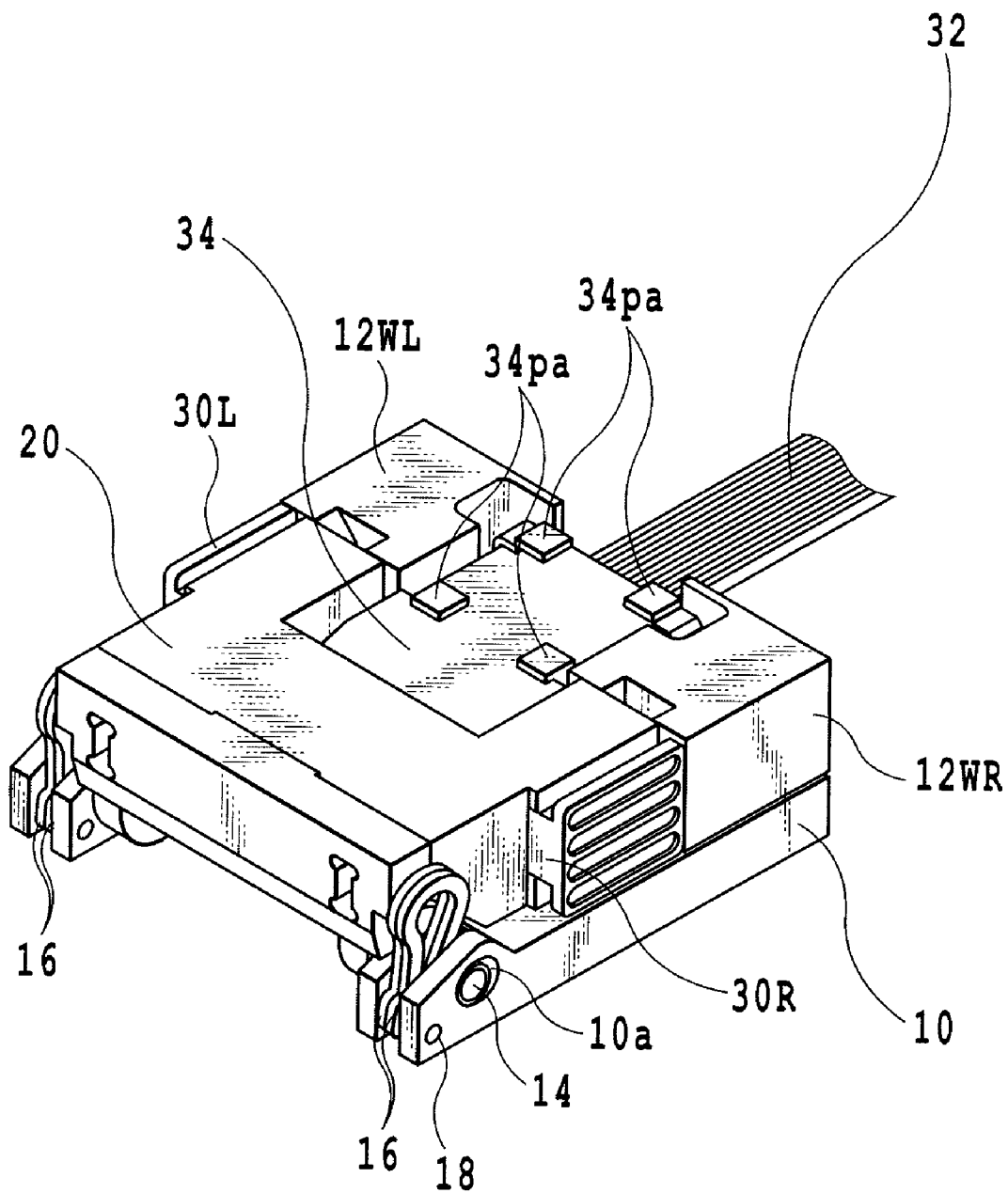
FIG. 2 is a perspective view illustrating a locked state of a receptacle mounting a connector plug in the embodiment shown in FIG. 1.

FIG. 2 illustrates an appearance of an optical connector provided with a first embodiment of a releasable locking mechanism according to the present invention.

In FIG. 2, the optical connector is arranged on a printed wiring board constituting part of an optical communication system, for example.

The optical connector includes, as main elements, a installation table 10 disposed on the printed wiring board, a connector plug 34 connected to one end of a group of optical fibers 32, and a receptacle 20 rotational movable supported by the installation table 10, for detachably accommodating a tubular portion (see FIG. 5) as a connecting section of the connector plug 34. In addition thereto, the optical connector further includes a locking/unlocking mechanism for locking or unlocking the connector plug 34 relative to the receptacle 20 and a wiring unit section for electrically connecting the printed wiring board not illustrated to the receptacle 20 described later.

Figure 1:
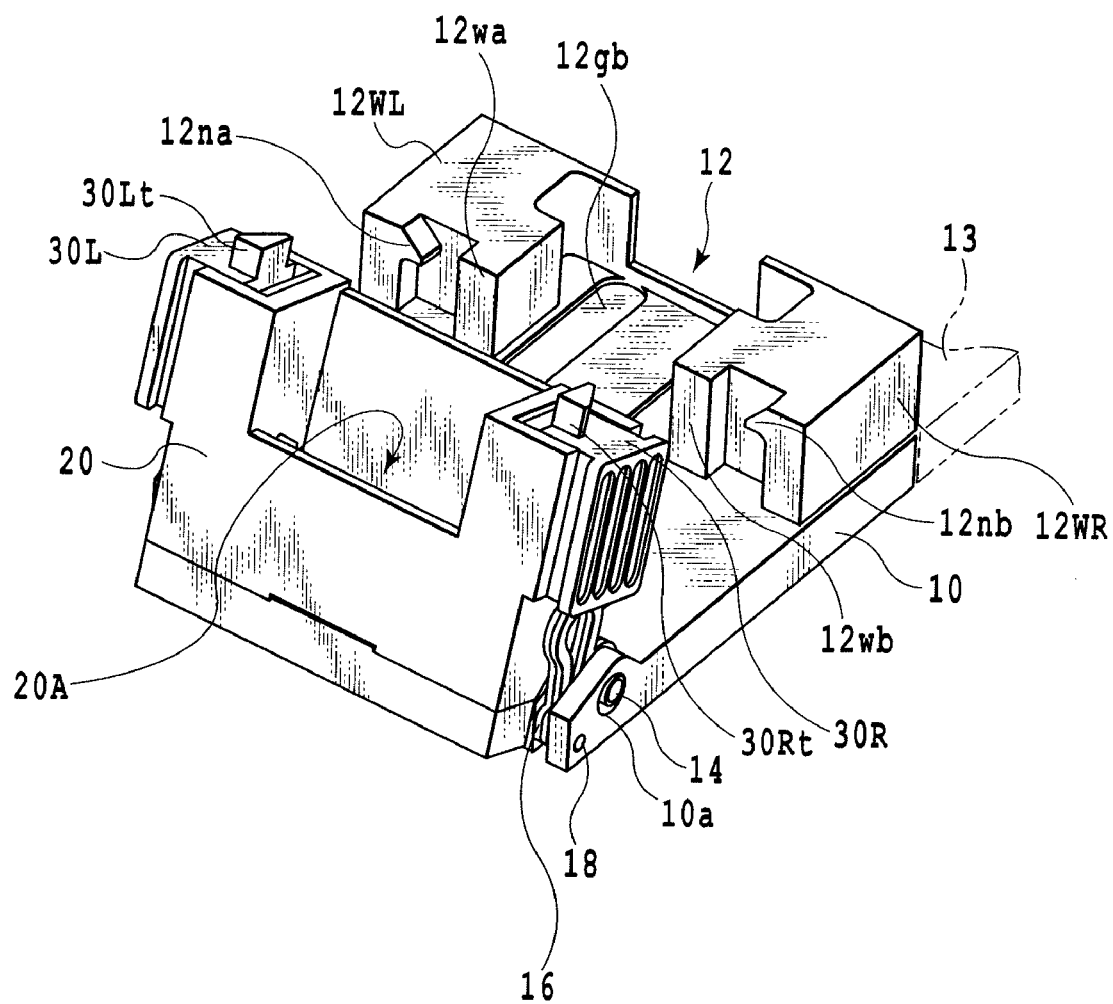
FIG. 1 is a perspective view illustrating an appearance of an optical connector provided with a first embodiment of a releasable locking mechanism for an optical connector according to the present invention.

Also, in the wiring unit section, as shown in FIG. 1 as a chain double-dashed line, a metallic heat sink 13 may be provided adjacent to the installation table 10, as means for effectively dissipating heat generating in relation to the printed wiring board or the receptacle 20.

In this regard, FIG. 2 illustrates a state wherein the connector plug 34 is locked to the receptacle 20 and the installation table 10.

Kinds of optical fibers 32 are, for example, a single mode or a multi mode. Also, the optical fibers 32 are a bundle of individual wires having a predetermined diameter. In this regard, the optical fibers 32 may be a tape type core wire, for example.

Figure 3:
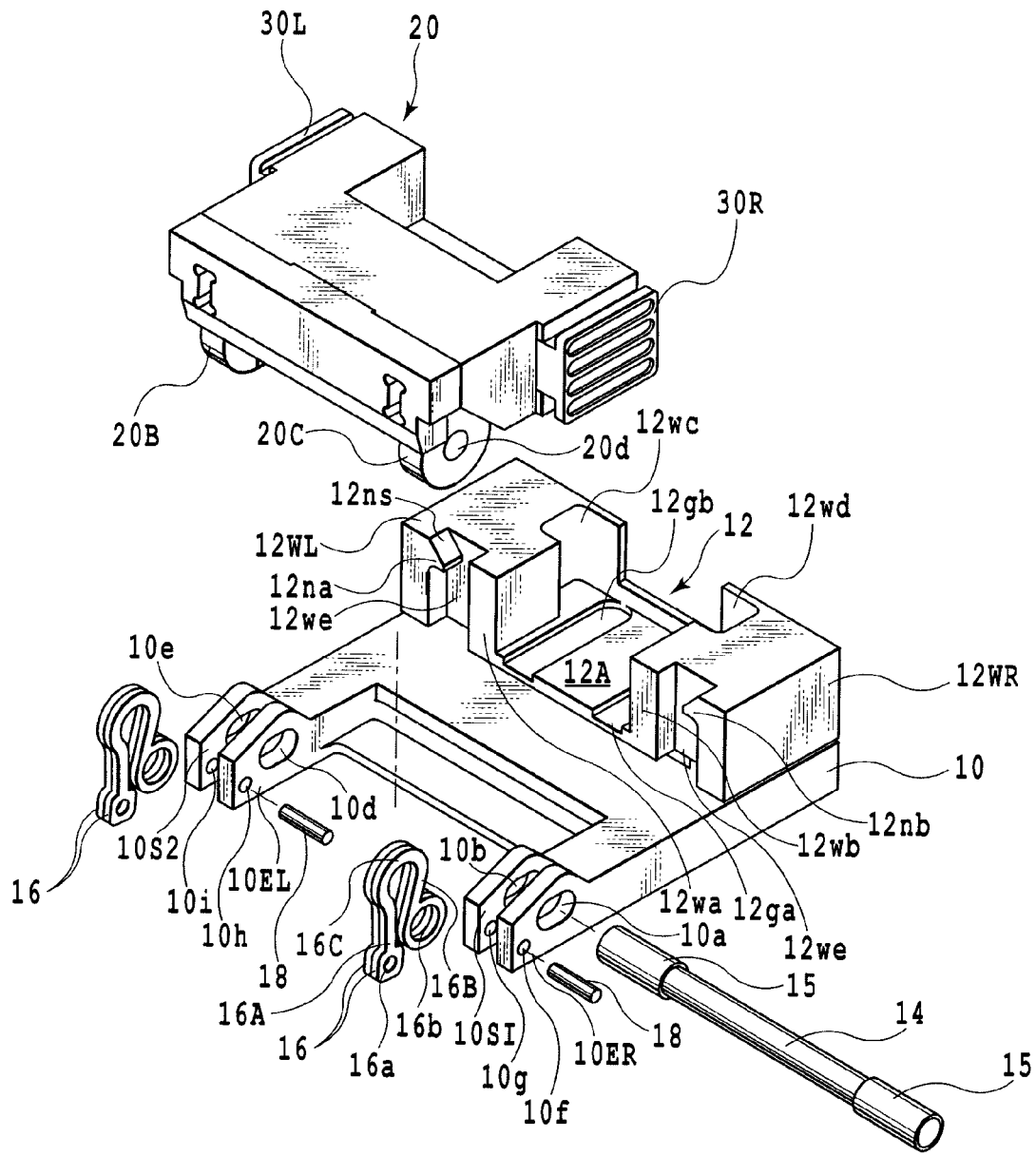
FIG. 3 is an exploded perspective view of the embodiment shown in FIG. 1.
Figure 4:
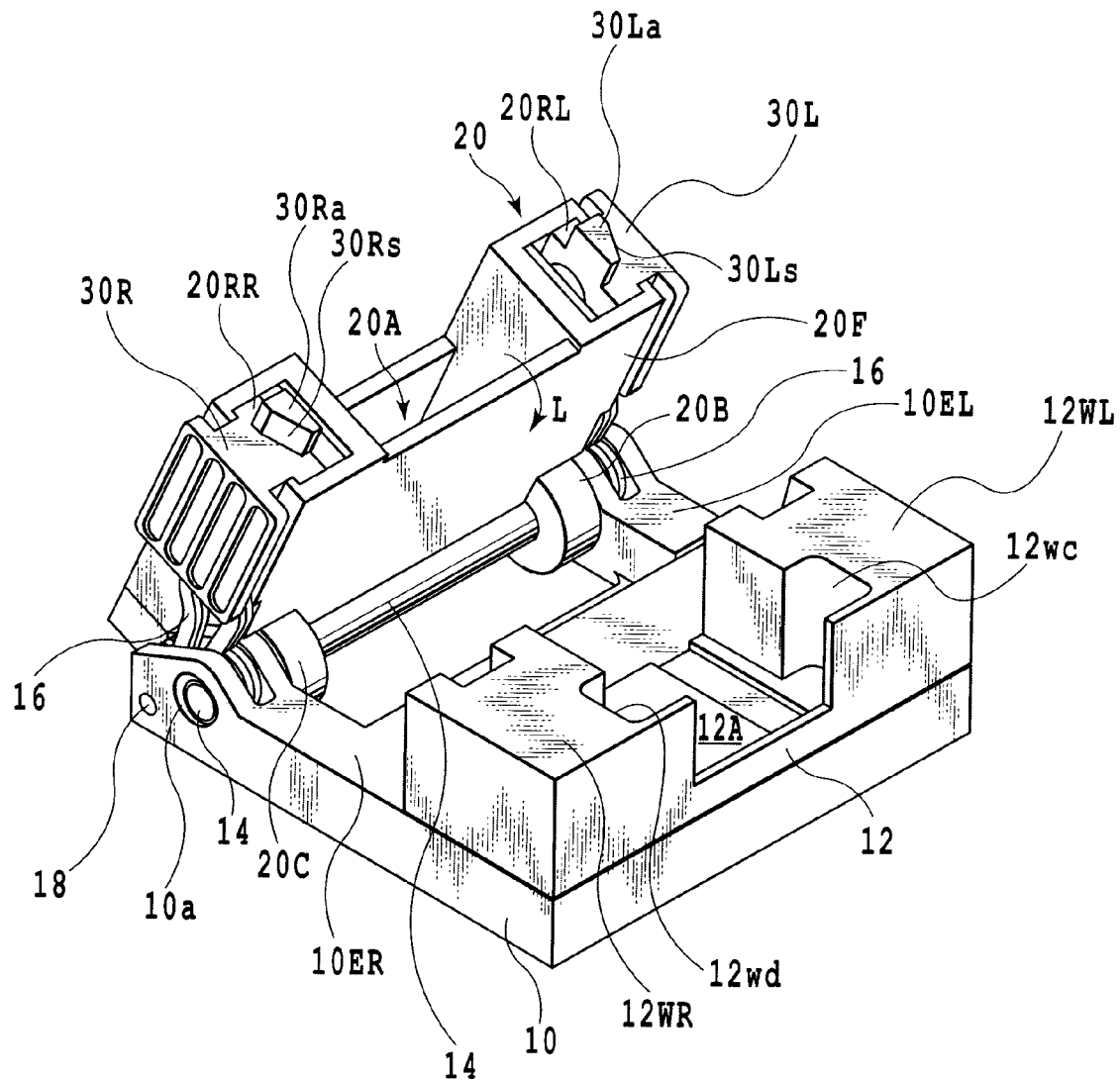
FIG. 4 is a perspective view of the receptacle in an unlocked state in the embodiment shown in FIG. 1.

As shown in FIG. 3, the installation table 10 made, for example, of resin has a pair of bearings 10EL and 10ER at on end thereof. The pair of bearings 10EL and 10ER are opposed to each other at predetermined distance between the both. As shown in FIG. 4, coupling portions 20B and 20C of the receptacle 20 described later are arranged between the bearings 10EL and 10ER.

The bearing 10ER has a slit 10S1 at a middle portion thereof, formed parallel to a side surface of the installation table 10. Also, ellipsoidal holes 10a and 10b are formed in the bearing 10ER on a common central axis. Into the respective holes 10a and 10b, one end of a columnar shaft 14 are inserted via reinforcement sleeves 15 while crossing the slits 10S1. In this regard, the holes 10a and 10b have the same shape to each other, and a length of a major axis of each the holes 10a and 10b is determined in accordance with a moving amount of one end of the shaft 14 described later and an elastic displacement of a movable end of a leaf spring 16

In FIG. 3, circular holes 10f and 10g are formed on a common central axis at positions obliquely lower left relative to the above-mentioned circular holes 10a and 10b. Into the holes 10f and 10g, opposite ends of a shaft 18 described later are inserted while crossing the slit 10S1. The shaft 18 that is a so-called stopper pin for fixing the leaf spring 16 has a diameter smaller than that of the shaft 14.

In the slit 10S1, there are one end of the shaft 14, a reinforcement sleeve 15 and a plurality of leaf springs 16 as a second biasing member described later.

At each of opposite ends of the shaft 14, the reinforcement sleeve 15 is press-fit. An outer diameter of the mounted reinforcement sleeve 15 is determined so that a predetermined gap is formed around the inner circumference of the holes 10a and 10b. A total length of the shaft 14 is approximately equal to a length of a short side of the installation table 10.

The leaf spring 16 as a second biasing member is formed, for example, of a stamped thin steel sheet to have a roughly ohm (Ω) shape constituted by a fixed end portion 16A and a movable end portion 16B, each having an elongate hole 16a and a circular hole 16b, as well as an elastic bend portion 16C coupling the fixed end portion 16A and the movable end portion 16B to each other. The reinforcement sleeve 15 and the one end of the shaft 14 pass through the hole 16b larger than the elongate hole 16a. On the other hand, a shaft 18 passes through the elongate hole 16a. Note the leaf spring 16 used as an elastic member should not be limited to this example but may be formed of heat-resistant rubber or others.

Figure 10A:
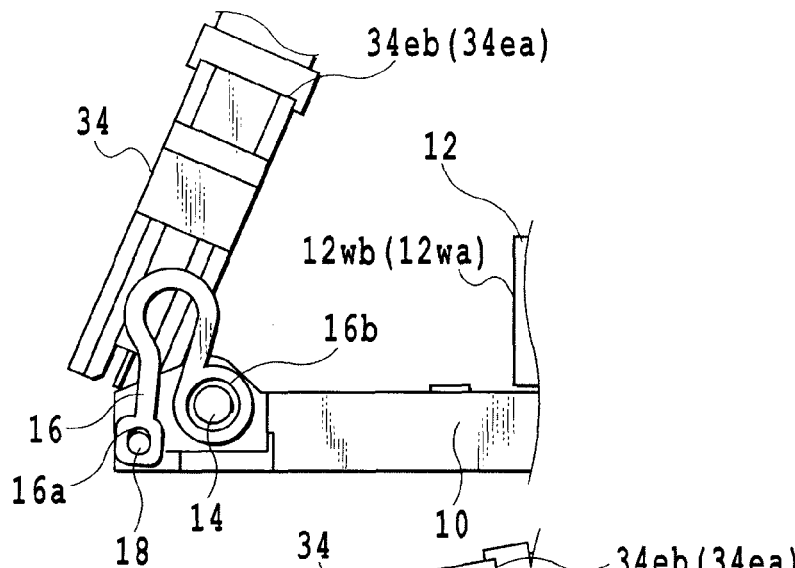
FIG. 10A is a view made available for illustrating the operation of the embodiment shown in FIG. 1.
Figure 10B:
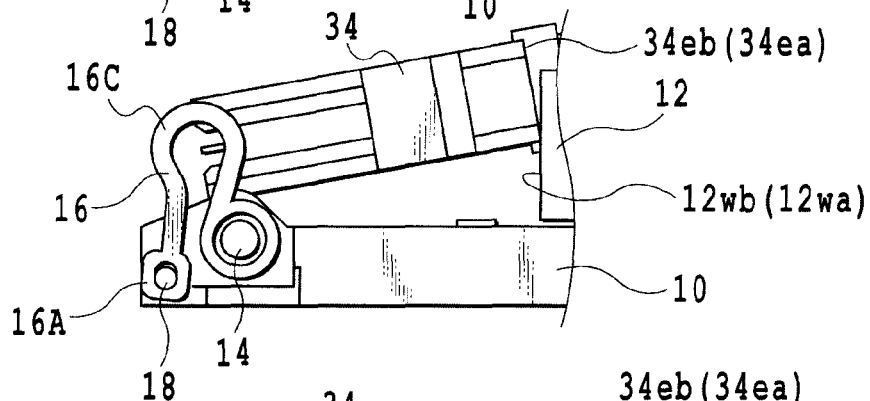
FIG. 10B is a view made available for illustrating the operation of the embodiment shown in FIG. 1.
Figure 10C:
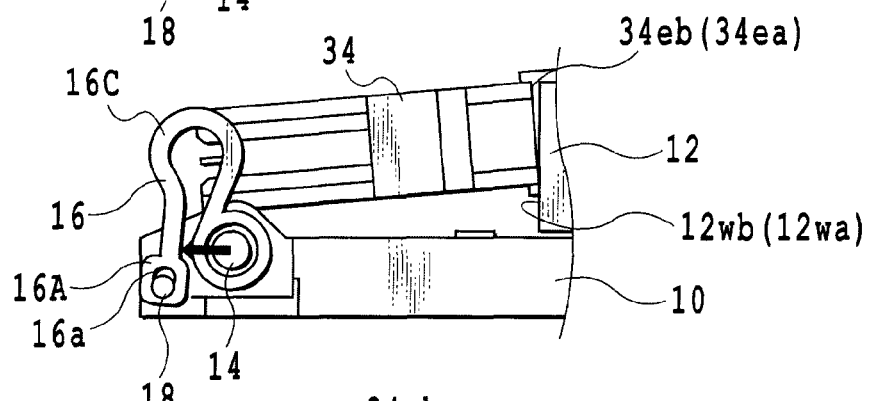
FIG. 10C is a view made available for illustrating the operation of the embodiment shown in FIG. 1.

As shown in FIGS. 10B and 10C, the movable end portion 16B is movable by the bend portion 16C away from or move closer to the fixed end portion 16A at a predetermined displacement in accordance with the movement of the shaft 14.

In this regard, while the a plurality of leaf springs 16 formed of thin sheets is used in this embodiment, this is not limitative but a leaf spring formed of a single sheet having the same thickness as a total thicknesses of the plurality of thin sheets may be disposed in the slit 10S1. Also, while the movable end portion 16B of the leaf spring 16 is fit to the outer periphery of the shaft 14, this is not limitative but a recess or a curvature portion formed in the movable end portion of the leaf spring 16 as an elastic member may be directly or indirectly via an interposed member engaged with the outer periphery of the shaft 14 not to be unfastened.

The bearing 10EL has a slit 10S2 at a middle portion thereof, formed parallel to the side surface of the installation table 10. Also, in the bearing 10EL, ellipsoidal holes 10d and 10e are formed on a common axis. Into the holes 10d and 10e, the other end of the above-mentioned shaft 14 is inserted via a reinforcement sleeve 15 while crossing the slit 10S2. In this regard, the ellipsoidal holes 10d and 10e opposed to the above-mentioned holes 10a and 10b have the same shape, and a length of a major axis of the ellipsoidal holes 10d and 10e are determined in accordance with the moving amount of one end of the above-mentioned shaft 14 as well as the elastic displacement of the movable end portion of the leaf spring 16.

Also, in FIG. 3, at positions obliquely lower left relative to the above-mentioned circular holes 10d and 10e, circular holes 10h and 10i are formed on a common central axis, into which are inserted opposite ends of the above-mentioned shaft 18 while crossing the slit 10S2. In the slit 10S2, similar to the slit 10S1, the other end of the above-mentioned shaft 14, reinforcement sleeve 15 and the above-mentioned plurality of leaf springs 16 as a second biasing member are provided.

There is fixed a locking mechanism fixing portion 12 consisting of a locking mechanism fixing walls 12WR and 12WL at an end of the installation table 10 opposed to the receptacle 20. In this regard, while the locking mechanism fixing portion 12 is formed separately from the installation table 10 according to this embodiment, this is not limitative, but for example, the locking mechanism fixing portion 12 may be formed in integral with the installation table 10 as a so-called base.

As shown in FIG. 3, the locking mechanism fixing wall 12WR and the locking mechanism fixing wall 12WL are formed opposite to one another across a communication path 12A.

On a wall surface of the locking mechanism fixing wall 12WR opposed to the communication path 12A, a recess 12wd is formed. In the recess 12wd, as shown in FIG. 2, a projection provided at a rear end of the connector plug 34 described later is inserted at a predetermined gap when the connector plug 34 is connected. Also, on an end surface 12wb of the locking mechanism fixing wall 12WR opposed to the receptacle 20, a recess 12we is formed. On a wall surface forming the recess 12we, a locking nib receiving portion 12nb is formed as part of a locking mechanism/unlocking mechanism described later. For example, the hook-shaped locking nib receiving portion 12nb is formed perpendicularly to a side surface of the locking mechanism fixing wall 12WR to be projected into the recess 12we. In the upper part of the locking nib receiving portion 12nb, as shown in FIGS. 3 and 7A to 7E, a slant 12ns for guiding a locking nib of the receptacle 20 described later is formed. A retaining surface formed in a lower part of the locking nib receiving portion 12nb contiguous to the slant 12ns is formed generally perpendicular to the side surface of the locking mechanism fixing wall 12WR.

On a wall surface of the locking mechanism fixing wall 12WL opposed to the communication path 12A, a recess 12wc is formed. In the recess 12wc, as shown in FIG. 2, a projection opposed to the projection provided at the rear end of the connector plug 34 described above is inserted at a predetermined gap when the connector plug 34 is connected. Also, on an end surface 12wa of the locking mechanism fixing wall 12WL opposed to the receptacle 20 as a position-restriction surface, a recess 12we is formed. On a wall surface forming the recess 12we, a locking nib receiving portion 12na is comprised as part of the locking mechanism/unlocking mechanism described later. The locking nib receiving portion 12na is formed perpendicularly to a side surface of the locking mechanism fixing wall 12WL to be projected into the recess 12we. In the upper part of the locking nib receiving portion 12na, as shown in FIGS. 3 and 7A to 7E, a slant 12ns for guiding a locking nib of the receptacle 20 described later is formed. A retaining surface formed in a lower part of the locking nib receiving portion 12na contiguous to the slant 12ns is formed generally perpendicular to the side surface of the locking mechanism fixing wall 12WL.

Figure 7A:
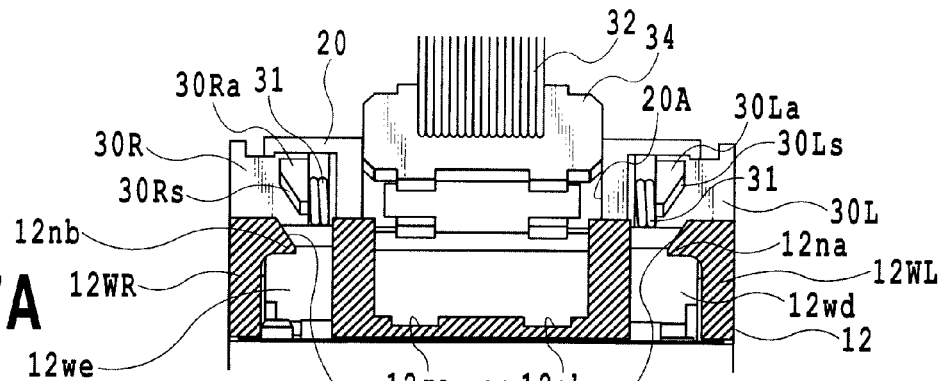
FIG. 7A is a partially sectional view made available for illustrating the operation of the embodiment shown in FIG. 1.
Figure 7B:
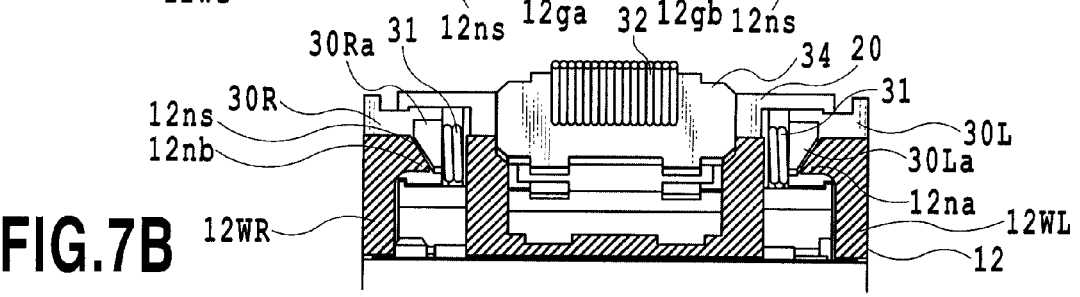
FIG. 7B is a partially sectional view made available for illustrating the operation of the embodiment shown in FIG. 1.
Figure 7C:
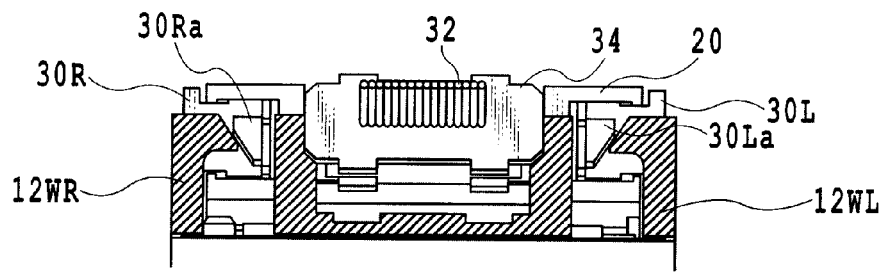
FIG. 7C is a partially sectional view made available for illustrating the operation of the embodiment shown in FIG. 1.
Figure 7D:
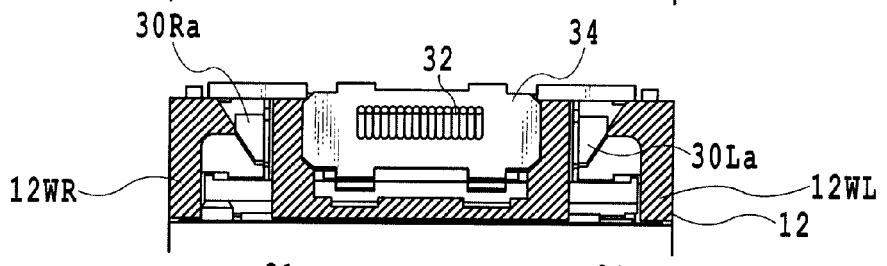
FIG. 7D is a partially sectional view made available for illustrating the operation of the embodiment shown in FIG. 1.
Figure 7E:
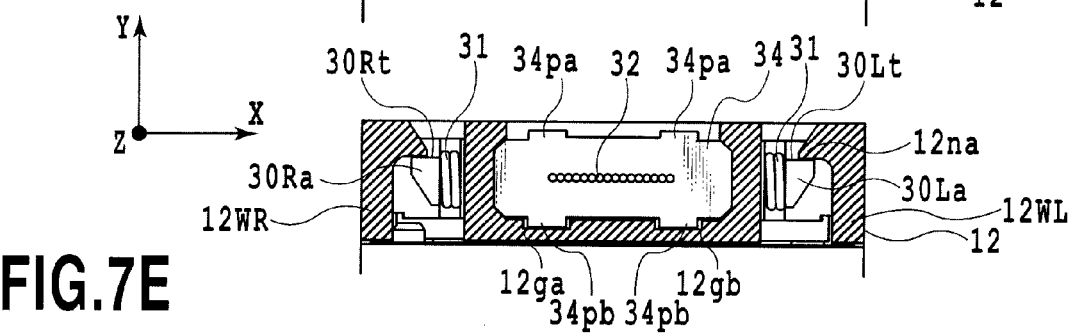
FIG. 7E is a partially sectional view made available for illustrating the operation of the embodiment shown in FIG. 1.

As shown in FIG. 7E, on a bottom of the communication path 12A, grooves 12ga and 12gb are formed generally parallel to each other, into which are inserted projections 34pb, respectively, opposed to a pair of projections 34pa of the connector plug 34. Depths of the grooves 12ga and 12gb are of the same dimension capable of completely accommodating the projections 34pb.

As shown in FIGS. 4 and 5, the receptacle 20 mainly includes a rotatable base 20F having coupling portions 20B and 20C coupled to a middle portion of the above-mentioned shaft 14 and an end cap 20E covering one end of the rotatable base 20F.

As shown in FIGS. 3 and 5, the coupling portions 20B and 20C formed on a lower surface of the rotatable base 20F opposite to each other at a predetermined distance have holes 20b and 20d, respectively, through which is inserted the middle portion of the shaft 14. Thereby, the receptacle 20 is supported by the rotatable base 20F and the shaft 14 to be rotatable relative to the installation base 10.

As shown in FIG. 4, the rotatable base 20F has a connector plug accommodation portion 20A for removably accommodating a tubular portion 34CL of the connector plug 34 as a connecting portion. In the interior of the connector plug accommodation portion 20A, a guide member 35 for guiding and supporting the tubular portion 34CL of the mounted connector plug is formed as enlarged in FIG. 5. Accordingly, the tubular portion 34CL of the connector plug 34 could be easily mounted to the connector plug accommodation portion 20A with a relatively small operative force.

On the inner circumference of the guide member 35, a micro-hole 35a is formed, through which a wire of optical fibers 32 projected into the tubular portion 34CL of the connector plug 34 passes. On the boundary between the connector plug accommodation portion and an end cap 20E described later, there is a transparent thin plate member 22 provided with a micro-lens 22L to which touches an end surface of the wire of the optical fibers 32 projected via the micro-hole 35a at a predetermined pressure. The thin plate member 22 may be made of glass or transparent resin. The thin plate member 22 is joined to an end of the connector plug accommodation portion 20A by the outer peripheral edge thereof. Also, since a center of an optical axis of the micro-lens 22L coincides with a center of an inner diameter of the micro-hole, it is possible to collimate light output from the optical fiber 32 or joint the collimated light to the optical fiber 32, whereby the input/output of outside optical signals becomes easy.

A vertical-cavity surface-emitting optical semiconductor element 24 is provided opposite to the above-mentioned micro-lens 22L on the inside of the end cap 20E. The vertical-cavity surface-emitting optical semiconductor element 24 is connected to a wiring portion 26 which in turn is electrically connected to the above-mentioned wiring unit section. Thereby, the vertical-cavity surface-emitting optical semiconductor element 24 is electrically connected to the above-mentioned printed wiring board via the wiring unit and the wiring portion 26.

At positions on the opposite sides of the connector plug accommodation portion 20A, as shown in FIG. 4, button accommodation portions 20RR and 20RL are formed, for movably accommodating lock releasing buttons 30R and 30L.

At an end of a wall forming the button accommodation portion 20RR, opposed to the locking mechanism fixing wall 12WR, and on a side vertical to that end, as shown in FIG. 4, an opening is formed wherein a locking nib 30Ra of the lock releasing button 30R and an operating part thereof project, respectively. Also, at an end of a wall forming the button accommodation portion 20RL, opposed to the locking mechanism fixing wall 12WL, and on a side vertical to that end, as shown in FIG. 4, an opening is formed wherein a locking nib 30La of the lock releasing button 30L and an operating part thereof project, respectively.

The lock releasing button 30R is disposed in the button accommodation portion 20RR along an axis of the shaft 14, that is, to be reciprocable generally perpendicular to a long side of the installation table 10. As shown in FIG. 7A, coil springs 31 are disposed as a first biasing member for biasing the lock releasing button 30R between ends of the lock releasing button 30R and the inner periphery of the button accommodation portion 20RR. The lock releasing button 30R has a step for engaging its operating part with a periphery of the opening. By the engagement of a step disposed within the button accommodation portion 20RR with the periphery of the opening, the release of the lock releasing button 30R as well as the predetermined amount of the movement thereof are restricted.

As shown in FIG. 1, a slant 30Rs of the generally triangular locking nib 30Ra of the lock releasing button 30R is formed opposite to a slant 12ns of the above-mentioned locking nib receiving portion 12nb. Also, on one of two sides intersecting the slant 30Rs, an engagement surface 30Rt is formed for engaging with a retaining surface contiguous to the slant 12ns of the locking nib receiving portion 12nb, when the receptacle 20 is made to rotate in the direction indicated by an arrow L in FIG. 4 to be in a locked state as described later.

The lock releasing button 30L is disposed in the button accommodation portion 20RL to be reciprocable along the axis of the shaft 14, i.e., generally vertical to the long side of the installation table 10. As shown in FIG. 7A, between ends of the lock releasing button 30L and the inner periphery of the button accommodation portion 20RL, coil springs 31 for biasing the lock releasing button 30L are provided. The lock releasing button 30L has a step for engaging its operating part with a periphery of the opening. By the engagement of a step disposed within the button accommodation portion 20RL with the periphery of the opening, the release of the lock releasing button 30L as well as the predetermined amount of the movement thereof are restricted.

As shown in FIG. 1, a slant 30Ls of the generally triangular locking nib 30La of the lock releasing button 30L is formed opposite to a slant 12ns of the above-mentioned locking nib receiving portion 12na. Also, as shown in FIG. 7E, on one of two sides intersecting the slant 30Ls, an engagement surface 30Lt is formed for engaging with a retaining surface contiguous to the slant 12ns of the locking nib receiving portion 12na, when the receptacle 20 is made to rotate in the direction indicated by an arrow L in FIG. 4 to be in a locked state as described later.

Accordingly, the locking/unlocking mechanism for locating the receptacle 20 connected to the connector plug 34 selectively in the locked state or the unlocked state relative to the installation table 10 and the locking mechanism fixing portion 12 includes the locking nib 30Ra of the lock releasing button 30R and the locking nib 30La of the lock releasing button 30L; locking nib receiving portions 12na and 12nb; and the coil springs 31.

Figure 8A:
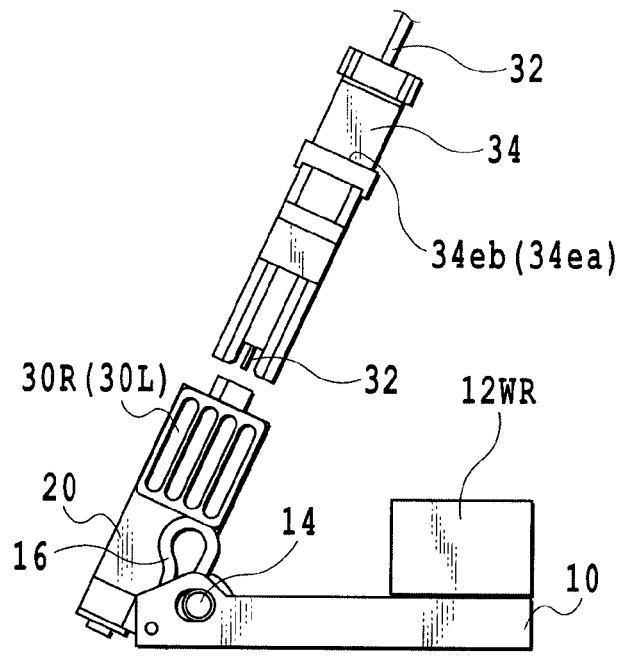
FIG. 8A is a view made available for illustrating the operation of the embodiment shown in FIG. 1.
Figure 8B:
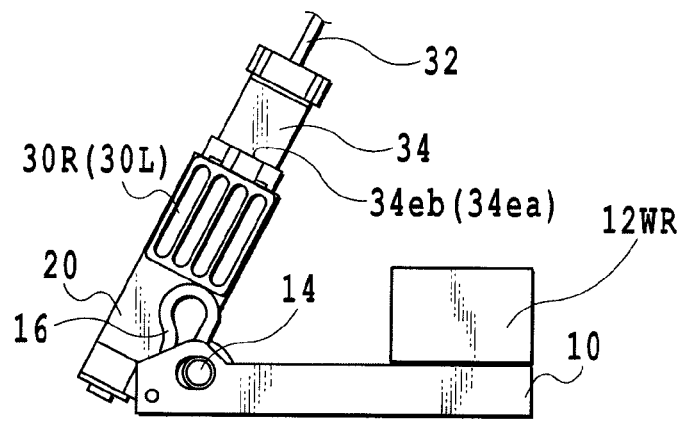
FIG. 8B is a view made available for illustrating the operation of the embodiment shown in FIG. 1.
Figure 8C:
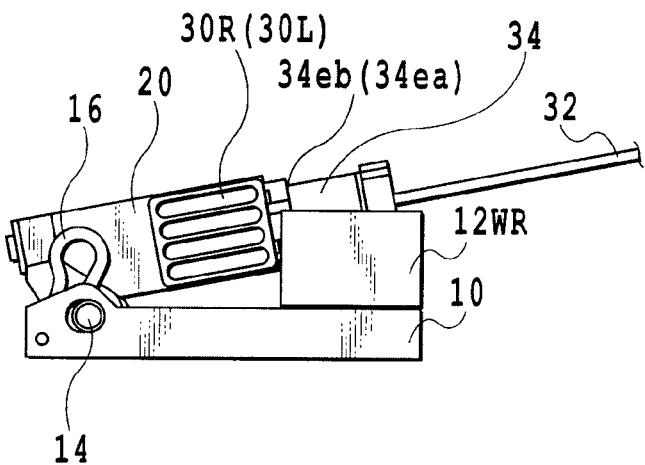
FIG. 8C is a view made available for illustrating the operation of the embodiment shown in FIG. 1.

In such a structure, as shown in FIGS. 8A and 8B, when the receptacle 20 to which is mounted the connector plug 34 is in the locked state relative to the locking mechanism fixing portion 12, the receptacle 20 is first made to rotate against the biasing force of the leaf spring 16 toward the end surfaces 12wa and 12wb of the locking mechanism fixing portion 12 as shown in FIGS. 7A and 8C.

Then, as shown in FIGS. 7B and 7C, when the receptacle 20 is further made to rotate, the slants 30Rs and 30Ls of the locking nib 30Ra slide on the slants 12ns of the locking nib receiving portions 12na and 12nb, whereby the locking nib 30Ra and the locking nib 30La are moved in the direction to move closer to each other against the biasing force of the coil spring 31.

Subsequently, when the locking nib 30Ra and the locking nib 30La are moved to a predetermined maximum displacement by further pushing and rotating the receptacle 20, the slants 30Rs and 30Ls of the locking nib 30Ra and the locking nib 30La are pressed down while being apart from the end of the slant 12ns, as shown in FIG. 7D. Thereby, the locking nib 30Ra and the locking nib 30La are respectively displaced apart from each other by the biasing force of the coil spring 31, and thus, as shown in FIG. 7E, the engagement surfaces 30Rt and 30Lt of the locking nib 30Ra and the locking nib 30La are engaged with the retaining surfaces of the locking nib receiving portions 12na and 12nb, respectively, to be a locking state. At that time, since two projections 34pb of the connector plug 34 are inserted into the groove 12ga and the groove 12gb, respectively, an outer surface of the connector plug 34 touches to the bottom surface of the communication path 12A.

Accordingly, the movement of the receptacle 20 to which is mounted the connector plug 34 is restricted in either of directions on the coordinate axes X, Y and Z of a rectangular coordinates shown in FIG. 7E. Note that the coordinate axis Z is defined along the axial direction of the connector plug 34 and the optical fibers 32.

Figure 6A:
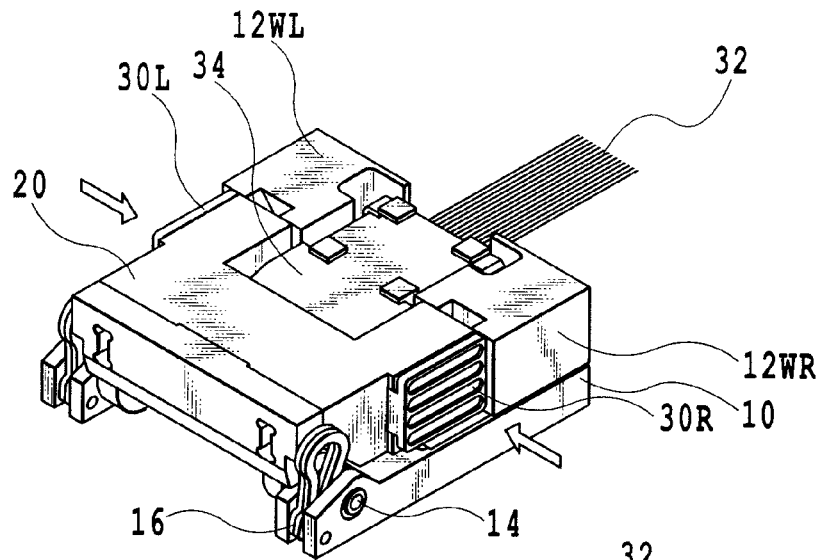
FIG. 6A is a perspective view made available for illustrating the operation of the embodiment shown in FIG. 1.

On the other hand, when the receptacle 20 to which is mounted the connector plug 34 is changed from the locked state to the unlocked state relative to the locking mechanism fixing portion 12, as shown in FIG. 6A, first the operating part of the lock releasing button 30R and the operating part of the lock releasing button 30L are pressed against the biasing force of the coil spring 31 in the direction shown by an arrow; i.e., move closer to each other. Thereby, the engagement surfaces 30Rt and 30Lt of the locking nib 12na and the locking nib 12nb are in the non-engagement state with the retaining surfaces of the locking nib receiving portions 12na and 12nb; i.e., in the unlocked state.

Figure 6B:
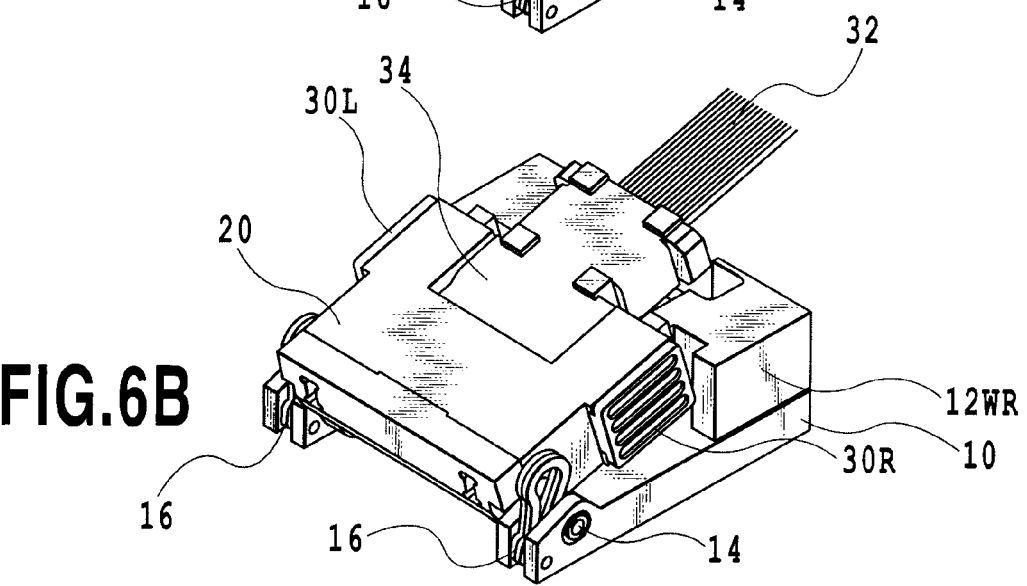
FIG. 6B is a perspective view made available for illustrating the operation of the embodiment shown in FIG. 1.
Figure 6C:
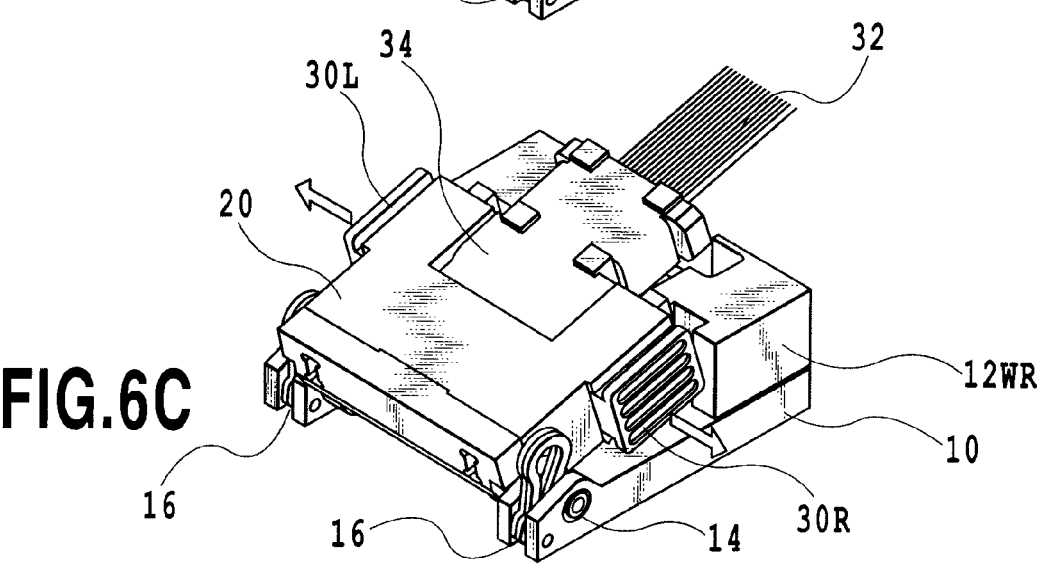
FIG. 6C is a perspective view made available for illustrating the operation of the embodiment shown in FIG. 1.

Next, as shown in FIG. 6B, in a state wherein the operating part of the locking releasing button 30R and the operating part of the locking releasing button 30L are pressed and held, the receptacle 20 is made to rotate counterclockwise at a predetermined angle in FIG. 6B. At that time, as shown in FIG. 6C, the operating part of the lock releasing button 30R and the operating part of the lock releasing button 30L return to the initial state by the biasing force of the coil spring 31.

And, the receptacle 20 to which is mounted the connector plug 34 returns to its initial position by the biasing force of the leaf spring 16.

Accordingly, the attachment/detachment of the connector plug 34 relative to the receptacle 20 could be carried out regardless of the rotating position of the receptacle 20, for example, the vertical position or the oblique position, and, in addition thereto, the handling of the connector plug 34 becomes easy.

Figure 9A:
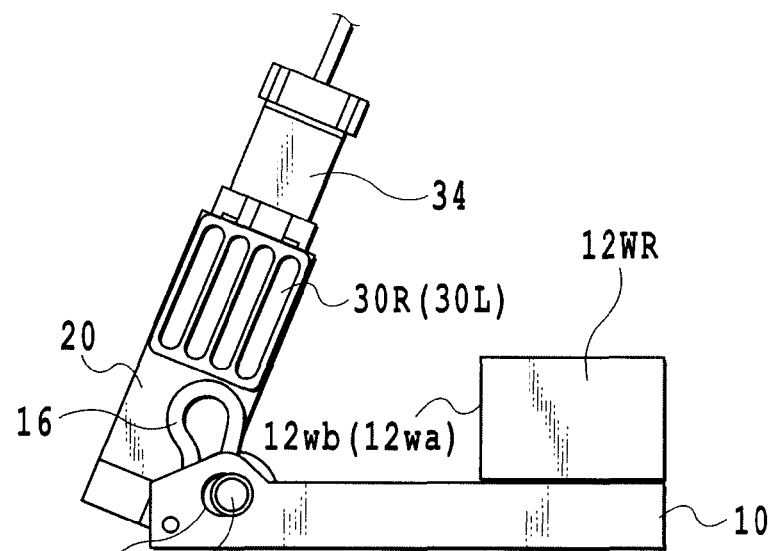
FIG. 9A is a view made available for illustrating the operation of the embodiment shown in FIG. 1.

As described above, when the receptacle 20 to which is mounted the connector plug 34 is in a locked state relative to the locking mechanism fixing portion 12, the end of the shaft 14 is positioned at one end of the hole 10a at an initial position as shown in FIGS. 9A and 10A, and the movable end 16B of the leaf spring 16 does not yet commence its movement.

Figure 9B:
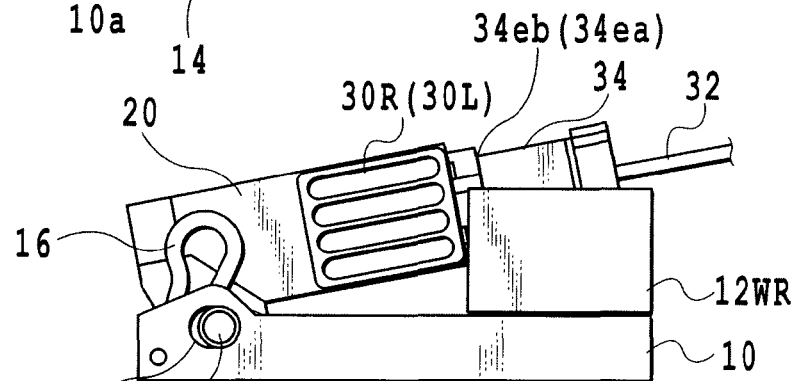
FIG. 9B is a partially side view made available for illustrating the operation of the embodiment shown in FIG. 1.
Figure 11A:
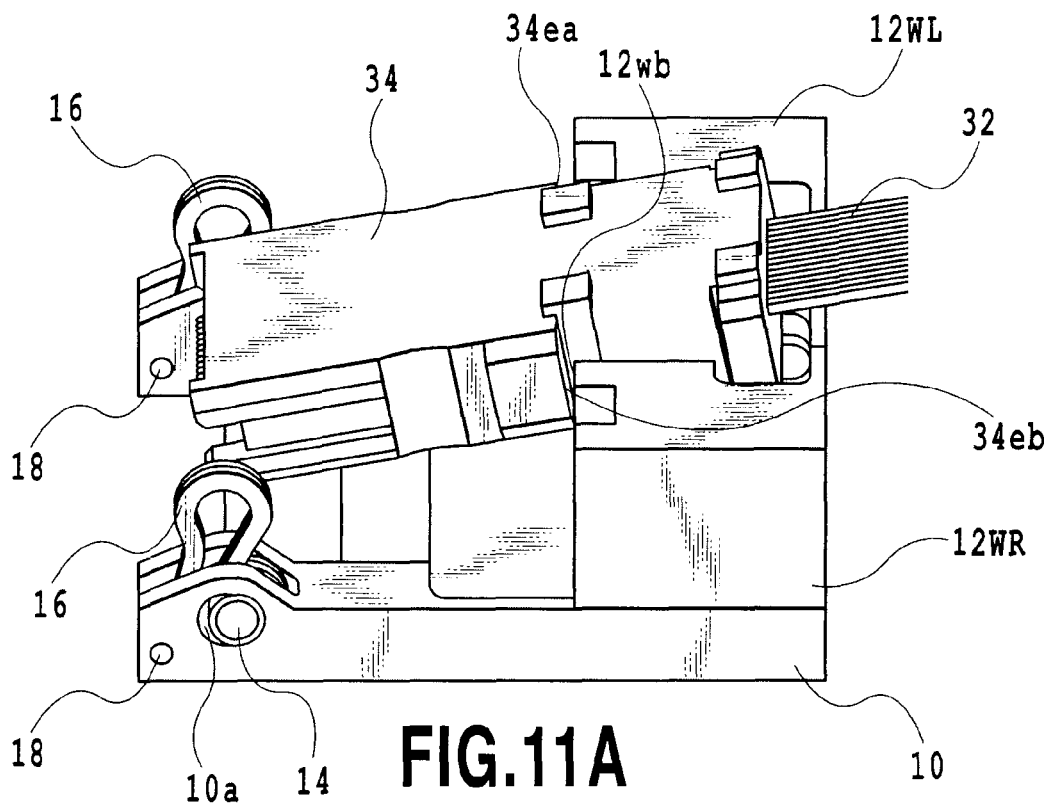
FIG. 11A is a perspective view made available for illustrating the operation of the embodiment shown in FIG. 1.

Next, when the receptacle 20 is further rotates against the biasing force of the leaf spring 16 as shown in FIGS. 9B and 10B, a pair of projections 34eb and 34ea formed opposite to the outer periphery of the connector plug 34 touch to the end surfaces 12wb and 12wa of the locking mechanism fixing portion 12 as enlarged in FIG. 11A.

Figure 9C:
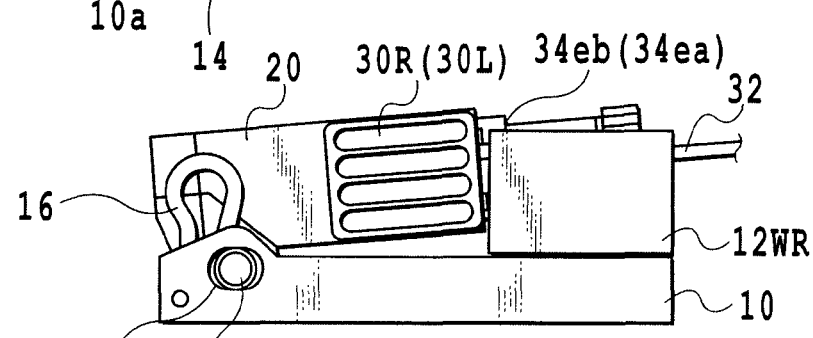
FIG. 9C is a partially side view made available for illustrating the operation of the embodiment shown in FIG. 1.

Subsequently, when the receptacle 20 is further pressed and made to rotate against the biasing force of the leaf spring 16, the projections 34eb and 34ea are moved downward while sliding on the end surface 12wb and 12wa of the locking mechanism fixing portion 12 as shown in FIGS. 9C and 10C. At that time, as shown in FIGS. 9C and 10C, since the coupling portions 20B, 20C of the receptacle 20 and the connector plug 34 are pressed against the biasing force of the leaf spring 16, the shaft 14 is moved away from one end of the hole 10a toward the other end. Also, the movable end 16B of the leaf spring 16 is moved in the direction indicated by an arrow in FIG. 10C.

Figure 9D:
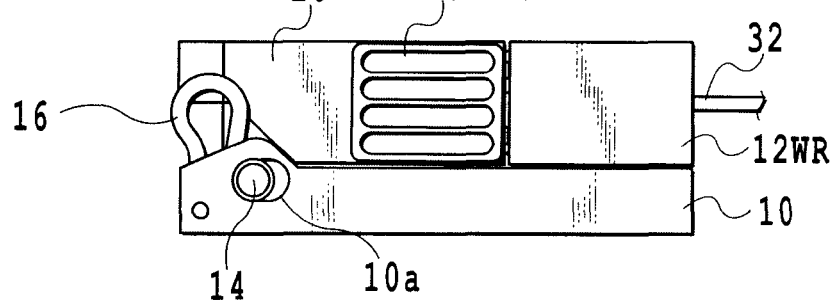
FIG. 9D is a partially side view made available for illustrating the operation of the embodiment shown in FIG. 1.
Figure 10D:
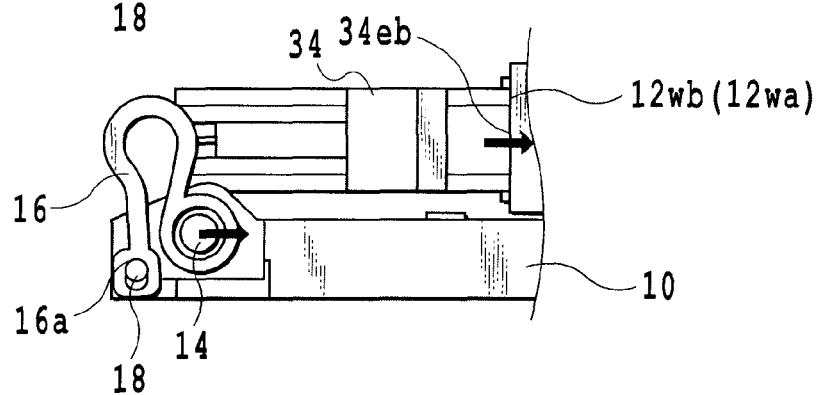
FIG. 10D is a view made available for illustrating the operation of the embodiment shown in FIG. 1.
Figure 11B:
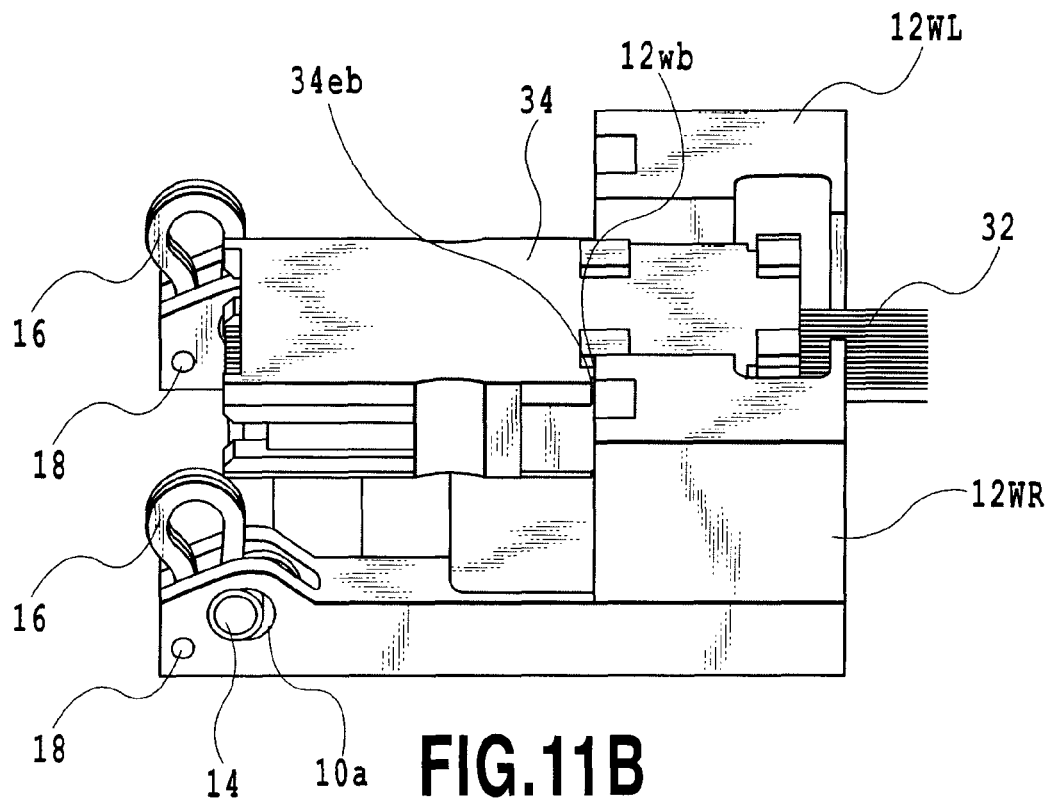
FIG. 11B is a perspective view made available for illustrating the operation of the embodiment shown in FIG. 1.

As shown in FIGS. 9D and 10D, in the state described above wherein the receptacle 20 is locked relative to the locking mechanism fixing portion 12, the shaft 14 touches to the other end of the hole 10a against the biasing force of the leaf spring 16. Also, as enlarged in FIG. 11B, the pair of projections 34eb and 34ea touch to the end surfaces 12wb and 12wa of the locking mechanism fixing portion 12, respectively, and, in addition thereto, the connector plug 34 is pressed in a more stable state in the direction indicating by an arrow in FIG. 10D via the receptacle 20 by the biasing force of the leaf spring 16. At that time, since the pair of projections 34eb and 34ea pressed by the biasing force of the leaf spring 16 touch to the end surface 12wb and 12wa of the locking mechanism fixing portion 12, the optical fibers 32 are immobile at all even if any stretching force is applied thereto, whereby the inconvenience is avoidable, wherein a gap of about 50 μm is generated between the micro-lens 22L and an end surface of a front end of the connector plug, and a front end of a wire of the optical fiber 32 is not brought into close contact with the micro-lens 22L, resulting in the impossibility of optical transmission.

The micro-lens 22L of the receptacle 20 is pressed to a contact end of the wire of the optical fibers 32 in the connecting portion of the connector plug 34 by a reactive force corresponding to the displacement amount of the movable end of the leaf spring 16, whereby a predetermined axial force operates in the direction indicated by an arrow in FIG. 5. For example, it is necessary to apply an axial force of about 50 g to a single wire of one optical fiber 32 and maintains the same. If the optical fibers 32 are formed of a number of wires, for example, 20 wires, the axial force of 50 g×20 wires=1000 g=1 kg is necessary.

Figure 14:
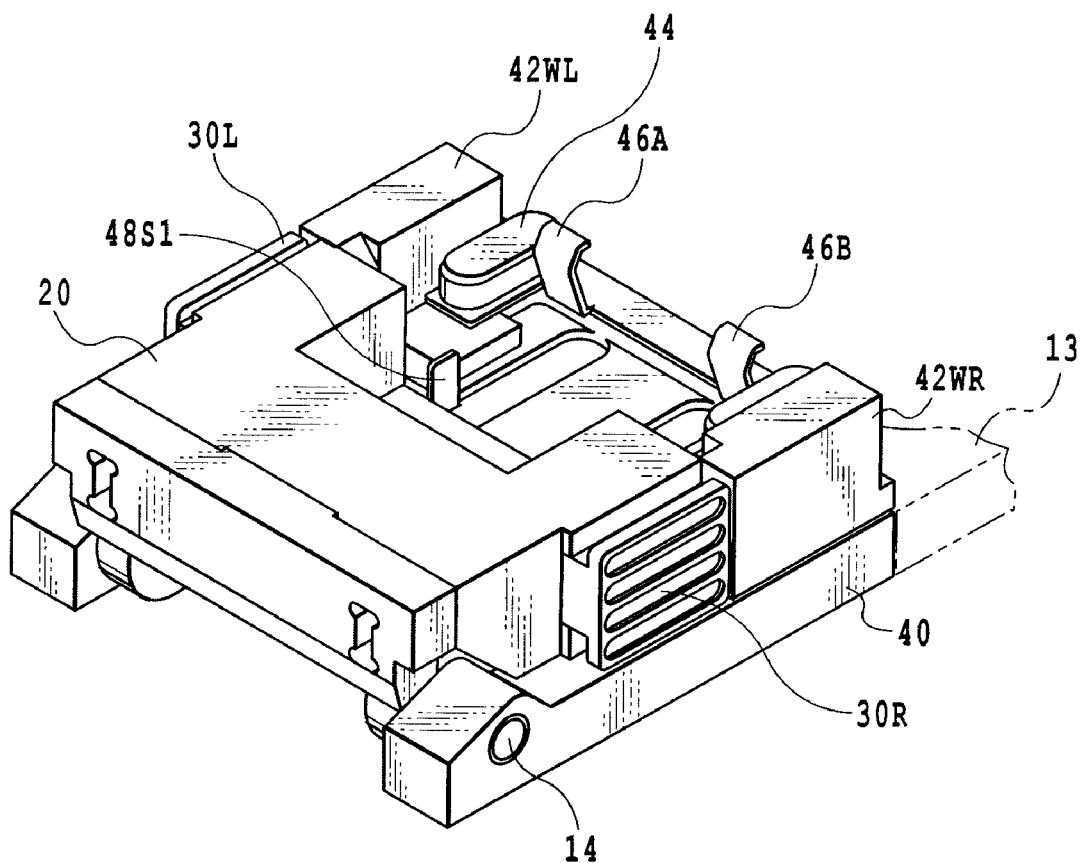
FIG. 14 is a perspective view of the embodiment shown in FIG. 12 to which is mounted a receptacle.

FIG. 14 illustrates part of the appearance of an optical connector provided with a releasable locking mechanism according to a second embodiment of the present invention.

In this regard, in FIGS. 12 to 16A, 16B and 16C described later as well as in further embodiments described later, the same reference numerals will be used for denoting the same constituent elements as those in the first embodiment shown in FIG. 2 and the redundant description thereof will be eliminated.

In FIG. 14, the optical connector is disposed on a printed wiring board constituting, for example, part of an optical communication system.

The optical connector mainly includes an installation table 40 disposed on the printed wiring board (not illustrated), a connector plug 34 (see FIGS. 16A, 16B and 16C) connected to one end of a group of optical fibers 32, and a receptacle 20 rotatably held on the installation table 40, for detachably accommodating a tubular portion (see FIG. 5) as a connecting section of the connector plug 34. Also, in addition thereto, the optical connector also has a locking/unlocking mechanism for making the connector plug 34 to be in the locked state or the unlocked state relative to the receptacle 20, and a wiring unit section for electrically connecting the printed wiring board not shown with the receptacle 20 described later. In the wiring unit section, as shown in FIG. 14 by a chain double-dashed line, a metallic heat sink 13 may be provided adjacent to the installation table 40, as means for effectively dissipating heat generated in relation to the printed wiring board or the receptacle 20.

Figure 15:
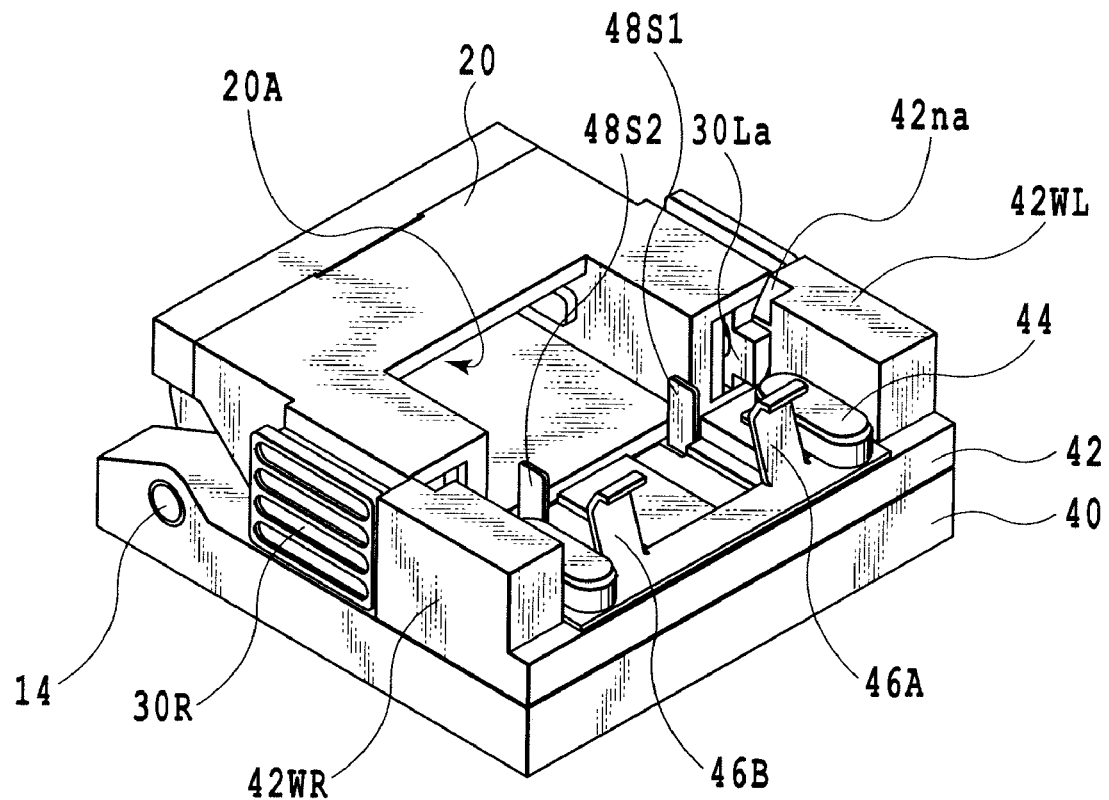
FIG. 15 is a perspective view of the embodiment shown in FIG. 12 wherein the receptacle is in a locked state.

For example, at one end of the installation table 40 made of resin, a pair of bearings 40EL and 40ER are formed opposite to each other at a predetermined interval. Between the bearings 40EL and 40ER, coupling portions 20B and 20C of the receptacle 20 are arranged, as illustrated in FIGS. 14 and 15.

In the bearings 40ER and 40EL, there are circular holes 40a and 40b on a common central axis into which is inserted opposite ends of a shaft 14 via reinforcement sleeves 15, respectively. A total length of the shaft 14 is approximately equal to a length of a short side of the installation table 40.

At an end of the installation table 40 opposed to the receptacle 20, a locking mechanism fixing portion 42 including locking mechanism fixing walls 42WR and 42WL is fixed.

Figure 12:
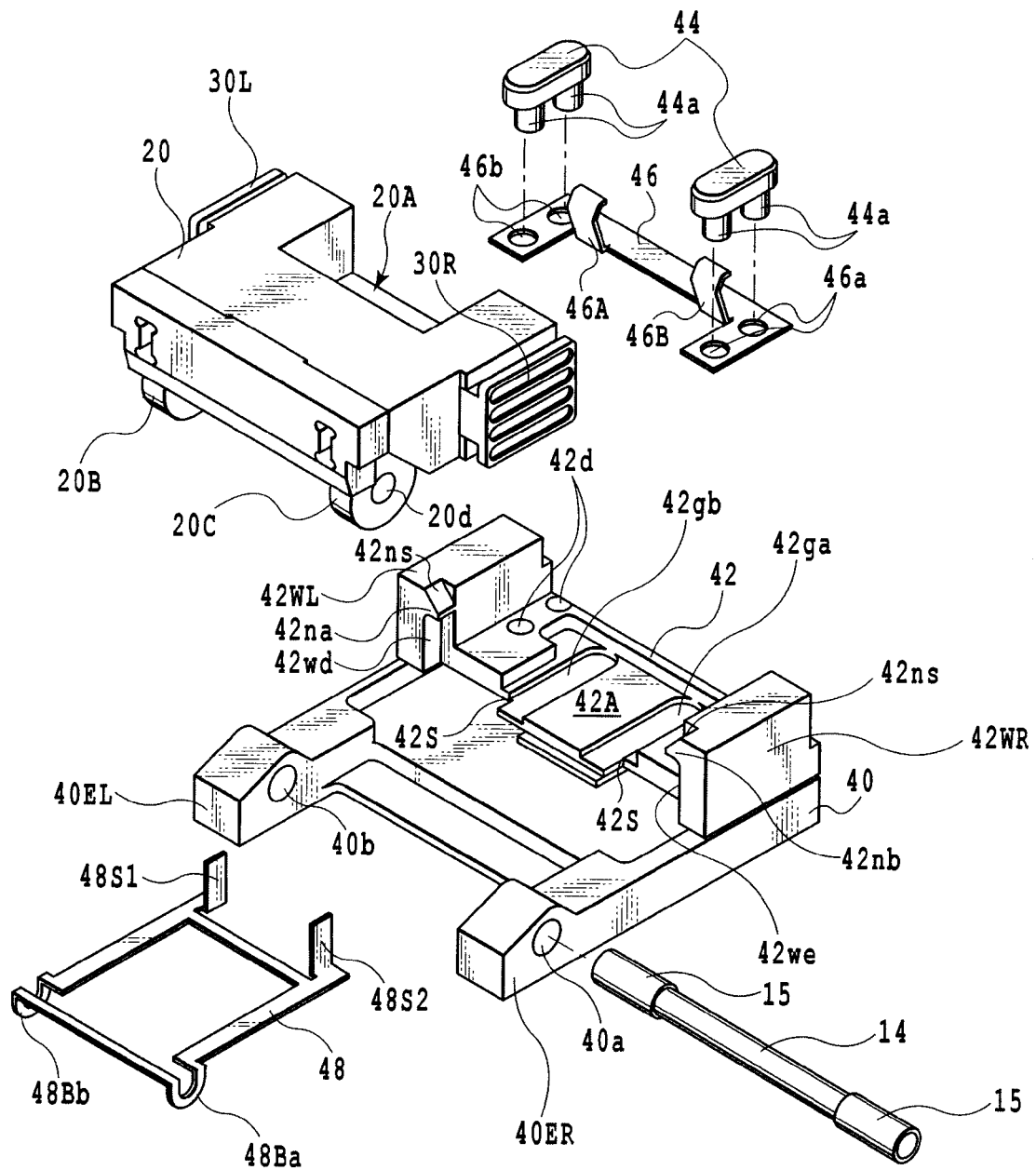
FIG. 12 is an exploded perspective view illustrating an optical connector provided with a second embodiment of a releasable locking mechanism for an optical connector according to the present invention.

The locking mechanism fixing wall 42WR and the locking mechanism fixing wall 42WL are formed opposite to each other across a communication path 42A as shown in FIG. 12.

On an end surface of the locking mechanism fixing wall 42WR opposed to the receptacle 20, a recess 42we is formed. On a wall surface forming the recess 42we, there is formed a locking nib receiving portion 42nb constituting part of the locking mechanism described later. The locking nib receiving portion 42nb is perpendicular to a side surface of the locking mechanism fixing wall 42WR and projects toward the communication path 42A. In an upper part of the locking nib receiving portion 42nb, a slant 42ns for guiding the locking nib of the receptacle 20 is formed similarly to the first embodiment. A retaining surface formed on a lower part of the locking nib receiving portion 42nb contiguous to the slant 42ns is generally perpendicular to a side surface of the locking mechanism fixing wall 42WR.

On an end surface of the locking mechanism fixing wall 42WL opposed to the receptacle 20 a recess 42wd is formed. On the wall surface forming the recess 42wd, a locking nib receiving portion 42na constituting part of the locking mechanism described later is formed. The locking nib receiving portion 42na is formed perpendicular to the side surface of the locking mechanism fixing wall 42WL while projecting toward the communication path 42A. In an upper part of the locking nib receiving portion 42na, a slant 42ns for guiding the locking nib of the receptacle 20 is formed opposite to the slant 42ns of the locking nib receiving portion 42nb. A retaining surface formed in a lower part of the locking nib receiving portion 42na is formed generally perpendicular to a side surface of the locking mechanism fixing wall 42WL.

Figure 13:
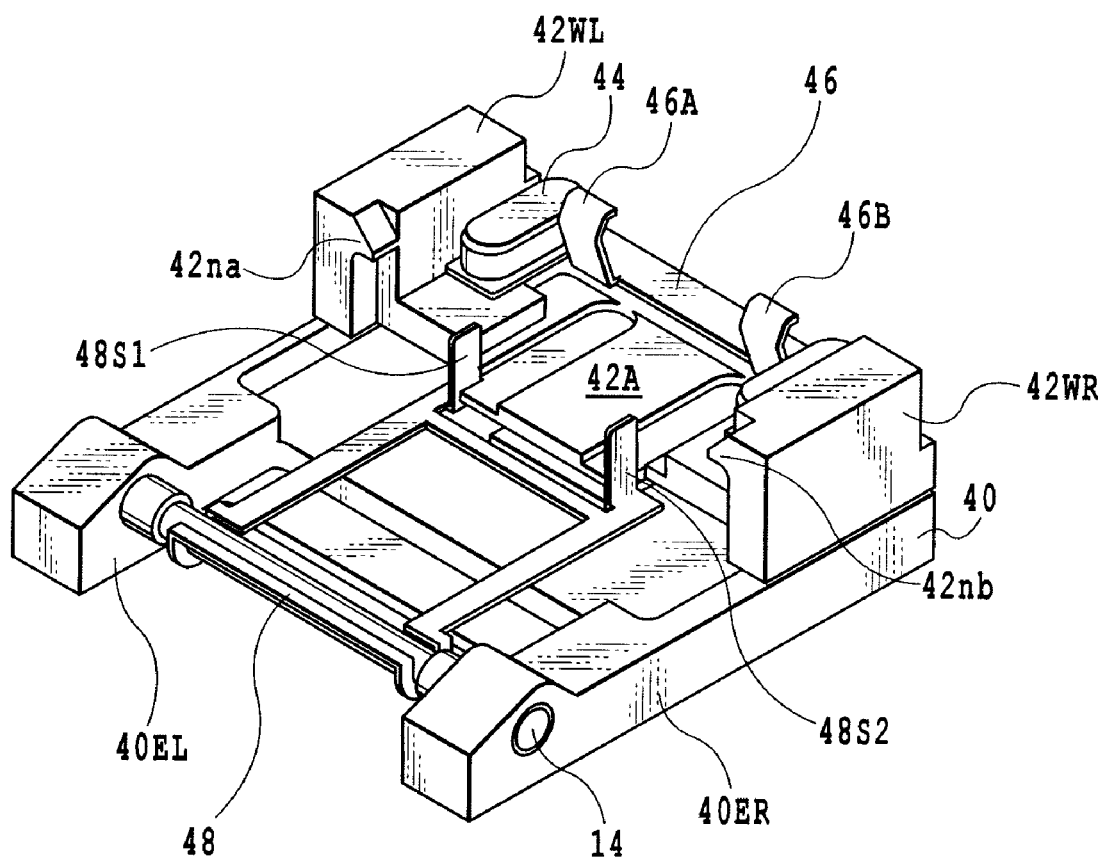
FIG. 13 is a perspective view of the embodiment shown in FIG. 12 from which is demounted a receptacle.

On the bottom of the communication path 42A, grooves 42ga and 42gb into which are inserted projections 34pb of the connector plug 34 are formed generally parallel to each other as illustrated in FIGS. 12 and 13. Depths of the grooves 42ga and 42gb are of the same dimension capable of completely accommodating the projections 34pb.

An open end formed at one ends of the grooves 42ga and 42gb projects from ends of other portions on the bottom of the communication path 42A by a predetermined length. By the intersection of the projected open ends of the grooves 42ga and 42gb with the ends of the other portions on the bottom of the communication path 42A, a stopper portion 42s to be locked with a position-restriction part of a position-restriction member 48 is formed. Accordingly, a step is formed between the bottom of the communication path 42A on which is formed the stopper 42s and a portion in which are formed the grooves 42a and 42gb.

Further, two holes 42d into which are press-fit two shaft portions 44a of a spring presser 44 described later are formed between the inner periphery of the locking mechanism fixing wall 42WR and the groove 42ga, and between the inner periphery of the locking mechanism fixing wall 42WL and the groove 42gb, respectively.

As shown in FIGS. 13 and 14, in the communication path 42A, a leaf spring 46 is disposed, for biasing an end portion 34EE of the connector plug 34 toward the receptacle 20. The leaf spring 46 as a second biasing member comprises a gate type fixing portion and pressing pieces 46A and 46B formed integral with the fixing portion, the pressing pieces being in contact with and pressing the end portion 34EE of the connector plug 34 as shown in FIG. 12. On opposite sides of the fixing portion, two holes 46a, 46b into which are inserted two shaft portions 44a of the respective spring presser 44 are formed. Thereby, as shown in FIGS. 13 and 14, the two shaft portions 44a of the respective spring presser 44 are press-fit into the holes 42d via the holes 46a, 46b to fix the leaf spring 46 to the bottom of the communication path 42A.

Figure 16A:
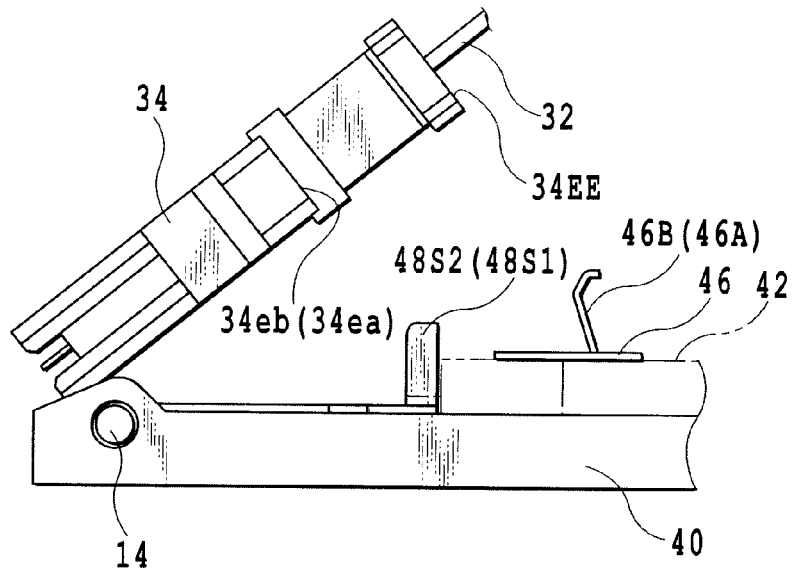
FIG. 16A is a view made available for illustrating the operation of the embodiment shown in FIG. 12.

Proximal ends of the pressing pieces 46A and 46B are integral with the fixing portion at a predetermined interval. The other end of the pressing piece 46A, 46B is inclined and curved toward the end portion 34EE of the connector plug 34 as shown in FIG. 16A.

Further, in an portion of the installation table 40 wherein the receptacle 20 communicated to the communication path is disposed, a position restricting member 48 is arranged at a position beneath the receptacle 20, for restricting the displacement of the connector plug 34 when the receptacle 20 is locked relative to the locking mechanism fixing portion 42.

The position restricting member 48 is made of flat plate to have a frame shape including, as shown in FIG. 12, a curvature portion forming a pair of bearings 48a and 48b engageable with a middle portion of the shaft 14, and a bending portion having a pair of fixing pieces 48S1 and 48S2 as position restricting means opposite to the curvature portion. As illustrated in FIG. 13, the bearings 48Ba and 48Bb of the curvature portion have arcuate parts corresponding to outer periphery of the middle portion of the shaft 14, respectively, formed by partially cutting out so that the middle portion of the shaft 14 can be inserted. The fixing pieces 48S1 and 48S2 are formed generally parallel to each other away from each other at a predetermined distance to be fixed with the stopper portion 42s at the open end of the above-mentioned projected grooves 42ga and 42gb. The fixing pieces 48S1 and 48S2 are formed while generally perpendicularly extending relative to the bottom surface of the communication path 42A. Accordingly, the position-restriction member 48 is positioned by the engagement of the bearings 48Ba and 48Bb of the curvature portion thereof with the middle portion of the shaft 14, and fixed to the installation table 40 by the fixing of the fixing pieces 48S1 and 48S2 with the stopper portion 42s. Since the receptacle 20 is supported by the shaft 14 at that time, the connector plug 34 is positioned to the receptacle 20 at a high accuracy.

In such a structure, when the receptacle 20 to which is mounted the connector plug 34, is in a locked state relative to the locking mechanism fixing portion 42, first, the receptacle 20 is made to rotate toward the end surface of the locking mechanism fixing portion 42.

Then, when the receptacle 20 is further made to rotate, the slants 30Rs and 30Ls of the locking nib 30Ra slide, respectively, on the slants 42ns of the locking nib receiving portions 42na and 42nb, whereby the locking nib s 30Ra and the locking nib s 30La are moved in the direction coming closer to each other against the biasing force of the coil spring 31.

Subsequently, when the receptacle 20 is further pressed and rotated whereby the locking nib 30Ra and the locking nib 30La are moved to a predetermined maximum displacement, the slants 30Rs and 30Ls of the locking nib 30Ra and the locking nib 30La, respectively, are away from the ends of the slants 42ns and pressed downward. Thereby, the locking nib 30Ra and the locking nib 30La are moved away from each other, whereby the engagement surfaces 30Rt and 30Lt of the locking nib 30Ra and the locking nib 30La are engaged with the retaining surfaces of the locking nib receiving portions 42na and 42nb, respectively, resulting in the locked state. At that time, since the two projections 34pb of the connector plug 34 are inserted into the grooves 12ga and 12gb, the outer surface of the connector plug 34 touches to the bottom surface of the communication path 42A.

Accordingly, similarly to the first embodiment, the movement of the receptacle 20 mounted with the connector plug 34 is restricted in either of the directions on the coordinate axes X, Y and Z in the rectangular coordinates shown in FIG. 7E.

On the other hand, when the receptacle 20 mounted with the connector plug 34 is changed from the locked state to the unlocked state relative to the locking mechanism fixing portion 42, the operating part of the lock releasing buttons 30R and the operating part of the lock releasing button 30L are first pressed against the biasing force of the coil spring 31 in the direction indicated by an arrow; i.e., move closer to each other. Thereby, the engagement surfaces 30Rt and 30Lt of the locking nib 30Ra and the locking nib 30La, respectively, become the non-engagement state relative to the retaining surfaces of the locking nib receiving portion potions 42na and 42nb, resulting in the unlocked state.

Then, the receptacle 20 is made to rotate counterclockwise in FIG. 6B at a predetermined angle similarly to the first embodiment, while maintaining the operating part of the lock releasing button 30R and the operating part of the lock releasing button 30L in the pressed state. At that time, the operating part of the lock releasing button 30R and the operating part of the lock releasing button 30L return to the initial state by the biasing force of the coil spring 31.

And, the receptacle 20 mounted with the connector plug 34 is detached against the biasing force of the pressing pieces 46A and 46B.

Figure 16B:
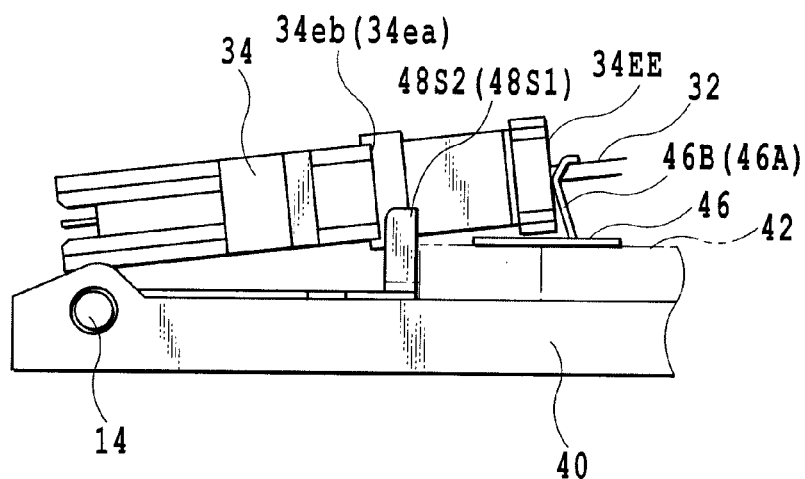
FIG. 16B is a view made available for illustrating the operation of the embodiment shown in FIG. 12.

As describe above, when the receptacle 20 mounted with the connector plug 34 becomes the locked state relative to the locking mechanism fixing portion 42, during the rotation of the receptacle 20 from the initial position shown in FIG. 16A to a position shown in FIG. 16B, the end portion 34EE of the connector plug 34 first touches to the pressing pieces 46A and 46B.

Figure 16C:
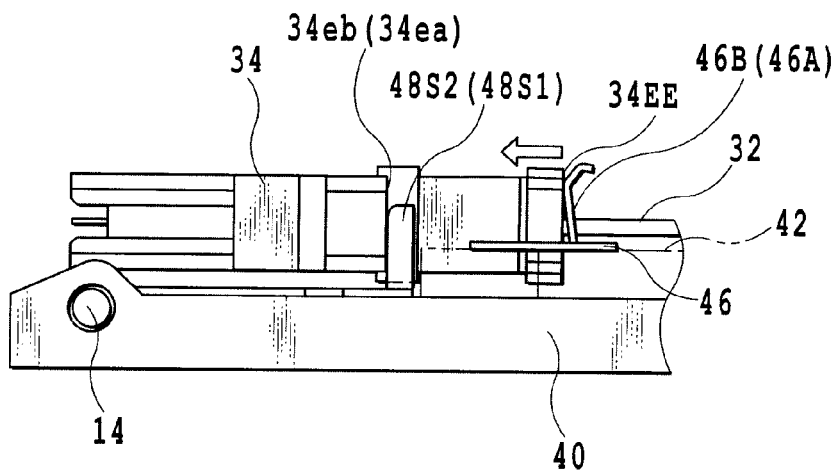
FIG. 16C is a view made available for illustrating the operation of the embodiment shown in FIG. 12.

Then, as illustrated in FIG. 16C, when the end portion 34EE of the connector plug 34 is further made to rotate against the elastic force of the pressing pieces 46A and 46B while sliding on the pressing pieces 46A and 46B, a pair of projections 34eb and 34ea formed opposed to the outer periphery of the connector plug 34 touch to ends of the fixing pieces 48S1 and 48S2.

As shown in FIG. 16C, when the receptacle 20 is in the above-mentioned locked state relative to the locking mechanism fixing portion 42, the pair of projections 34eb and 34ea touch to ends of the fixing pieces 48S1 and 48S2 and the receptacle 20 and the connector plug 34 are pressed in the direction indicated by an arrow in FIG. 16C by the elastic force of the pressing pieces 46A and 46B. At that time, since the pair of projections 34eb and 34ea pressed by the elastic force of the pressing pieces 46A and 46B touch to the fixing pieces 48S1 and 48S2, the separation of front ends of wires of the optical fibers 32 from the micro-lens 22L is avoidable even if any tension is applied to the optical fibers 32.

Also, since the micro-lens 22L of the receptacle 20 is pressed a contact end of the wire of the optical fibers 32 in the connecting portion of the connector plug 34 by a reaction force in accordance with the displacement of the pressing pieces 46A and 46B, a predetermined axial force operates in the direction indicated by an arrow in FIG. 5. For example, it is necessary that the axial force of about 50 g is applied to a single wire of one optical fiber 32 and maintained thereafter. When the optical fibers 32 are constituted by a number of individual wires, for example, 20 ends, the axial force of 50 g×20 ends=1000 g=1 kg is necessary.

In this regard, in the above-mentioned first and second embodiments, no ferrule is used as shown in FIG. 5. However, the present invention should not be limited thereto but may, of course, be applied to a connector plug provided with a ferrule as generally seen in the ordinary optical connectors. In such a case, an end surface of the optical fiber may coincide with that of the ferrule.

Figure 17:
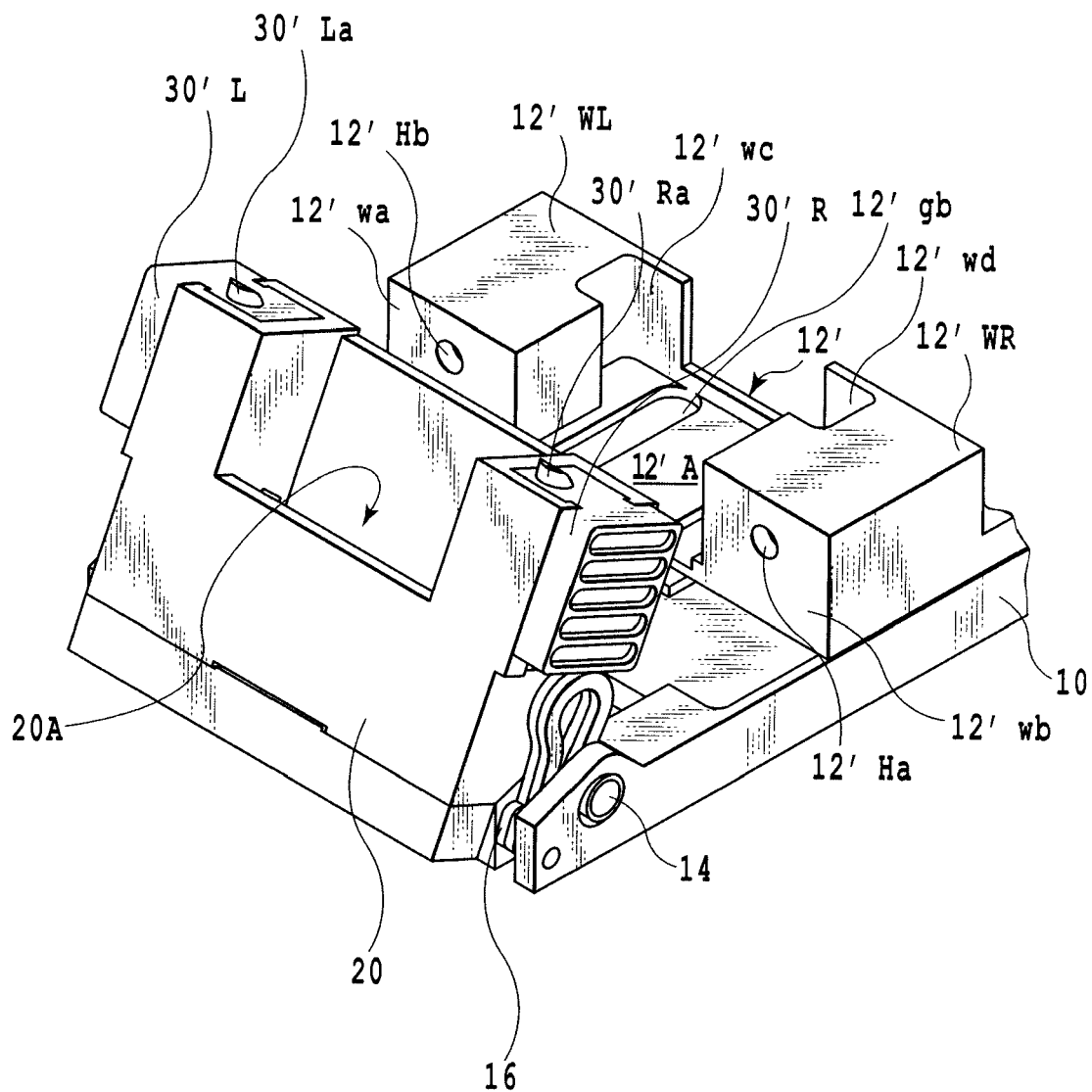
FIG. 17 is a perspective view illustrating a third embodiment of a releasable locking mechanism for an optical connector according to the present invention.
Figure 18:
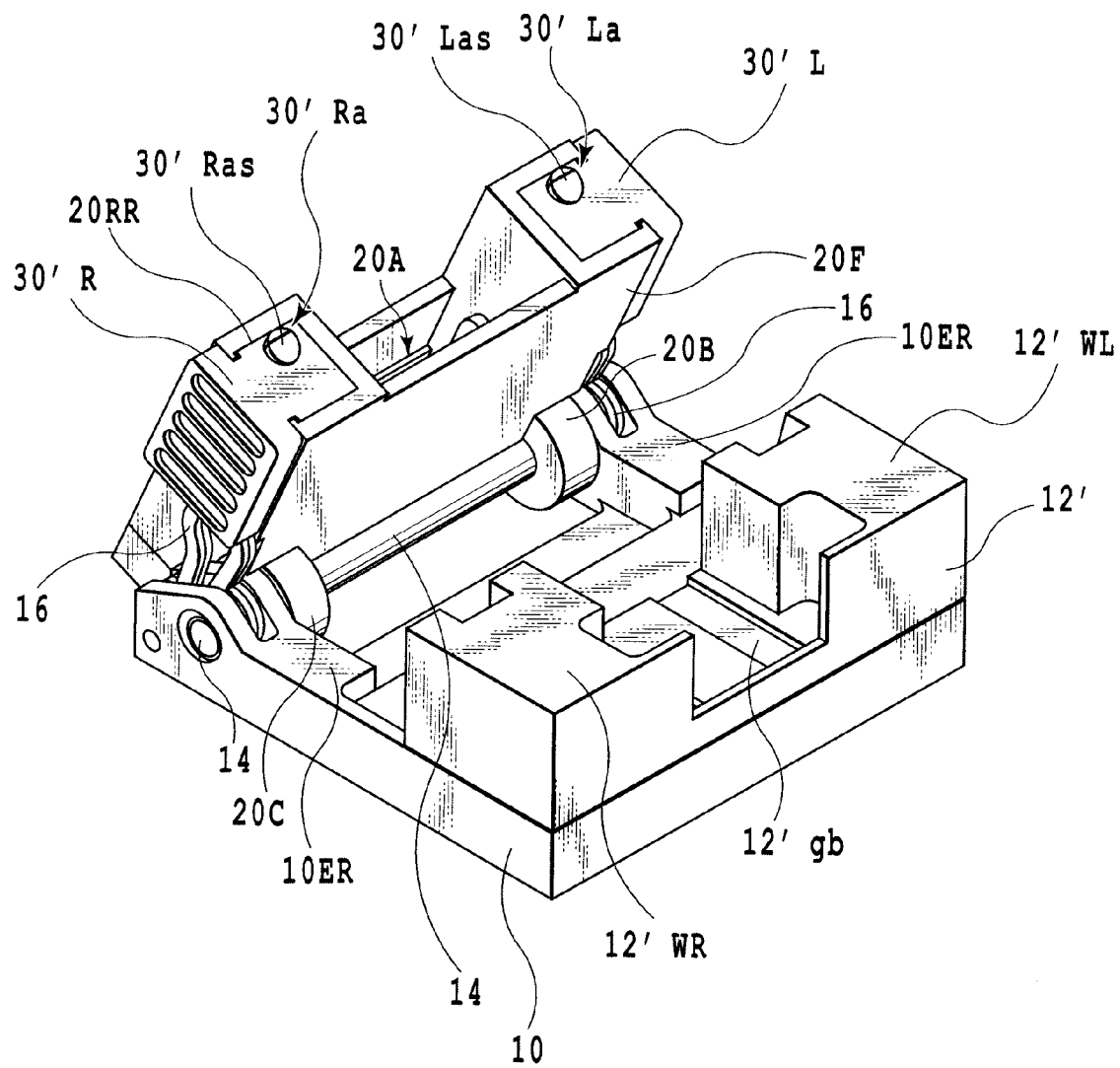
FIG. 18 is a perspective view of the embodiment shown in FIG. 17.

FIGS. 17 and 18 illustrate part of an optical connector provided with a releasable locking mechanism for an optical connector according to a third embodiment of the present invention.

The slant 30Rs of the locking nib 30Ra in the lock release button 30R and the slant 30Ls of the locking nib 30La in the lock releasing button 30L formed generally in a triangular shape in the embodiment shown in FIG. 2 are formed opposite to the slants 12ns of the locking nib receiving portion 12nb and the slant 12ns of the locking nib receiving portion 12na in the locking mechanism fixing portion 12, respectively. In this embodiment, however, a slant 30'Ras of a locking pin 30'Ra in a lock releasing button 30'R and a slant 30'Las of a locking pin 30'La in a lock releasing button 30'L formed in a generally cylindrical shape are formed opposite to a locking hole 12'Hb and a locking hole 12'Ha in the locking mechanism fixing portion 12', respectively.

At an end opposed to the receptacle 20 in the installation table 10, a locking mechanism fixing portion 12' consisting of a locking mechanism fixing walls 12'WR and 12'WL is fixed. In this regard, while the locking mechanism fixing portion 12' is formed separately from the installation table 10 according to this embodiment, this is not limitative, but the locking mechanism fixing portion 12' may be formed integral with the installation table 10, for example.

As shown in FIG. 17, the locking mechanism fixing wall 12'WR and the locking mechanism fixing wall 12'WL are formed opposite to each other across a communication path 12'A.

On a wall surface of the locking mechanism fixing portion 12'WR opposed to the communication path 12'A, a recess 12'wd is formed. In this recess 12'wd, a projection provided at a rear end of the connector plug 34 described later is inserted at a gap between the both when the connector plug 34 is connected. Also, on an end surface 12'wb of the locking mechanism fixing portion 12'WR opposed to the receptacle 20, a locking hole 12'Ha having a circular cross-section constituting part of a locking mechanism/unlocking mechanism described later is formed.

On a wall surface of the locking mechanism fixing wall 12'WL opposed to the communication path 12'A, a recess 12'wc is formed. In this recess 12'wc, a projection provided at a rear end of the connector plug 34 described above is inserted between the both when the connector plug 34 is connected. Also, on an end surface 12'wa in the locking mechanism fixing wall 12'WL as a position-restricting surface opposed to the receptacle 20, a hole 12'Hb having a circular cross-section constituting part of a locking mechanism/unlocking mechanism described later is formed.

On the bottom of the communication path 12A, grooves 12'ga and 12'gb into which are inserted the projections 34pb of the connector plug 34, respectively, are formed generally parallel to each other. Depths of the grooves 12'ga and 12'gb (see FIG. 18) are equal to each other, having a dimension capable of completely accommodating the projection 34pb.

Figure 19:
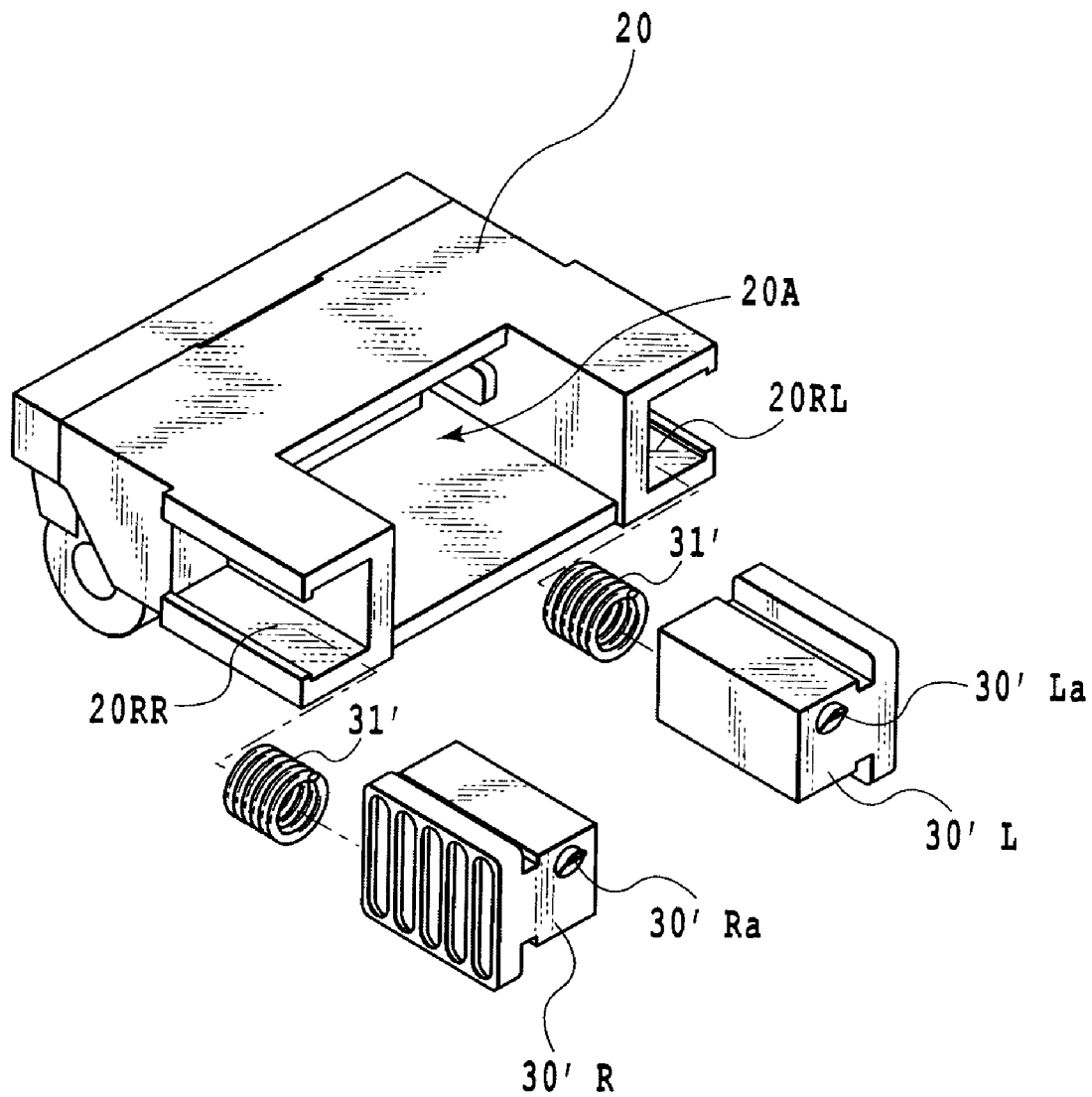
FIG. 19 is an exploded perspective view of constituent elements of the embodiment shown in FIG. 17.

As shown in FIG. 19, at an end opposed to the locking mechanism fixing wall 12'WR in a wall forming a button accommodation portion 20'RR and on a side vertical to this end, an opening from which are projected the locking pin 30Ra of the lock releasing button 30'R and the operating part thereof is formed. Also, at an end opposed to the locking mechanism fixing wall 12'WL in a wall forming a button accommodation portion 20'RL and on a side vertical to this end, an opening from which are projected the locking pin 30'La of the lock releasing button 30'L and the operating part thereof is formed.

The lock releasing button 30'R is disposed within the button accommodation portion 20'RR to be reciprocable in the direction vertical to the axis of the shaft 14; i.e., along the side surface of the installation table 10. A coil spring 31' is arranged as a first biasing member for biasing the lock releasing button 30'R, between the end of the lock releasing button 30'R and the inner periphery of the button accommodation portion 20'RR. The lock releasing button 30'R has a step engageable with the periphery of the opening from which projects the operating part thereof. By the engagement of the step disposed in the button accommodation portion 20'RR with the periphery of the opening, the removal of the lock releasing button 30R is restricted.

As shown in FIG. 1, the slant 30'Ras of the locking pin 30'Ra of the lock releasing button 30'R is formed opposite to the above-mentioned locking hole 12'Ha.

The lock releasing button 30'L is arranged in the button accommodation portion 20RL to be reciprocable in the direction vertical to the axis of the shaft 14; i.e., along the side surface of the installation table 10. As shown in FIG. 19, a coil spring 31' is disposed between an end of the lock releasing button 30'L and the inner periphery of the button accommodation portion 20RL, for biasing the lock releasing button 30'L. The lock releasing button 30'L has a step engageable with the periphery of the opening through which is projected an operating part thereof. By the engagement of the step disposed in the button accommodation portion 20RL with the periphery of the opening, the removal of the lock releasing button 30'L is restricted.

The slant 30'Las of the locking pin 30'La of the lock releasing button 30'L is formed while being opposed to the above-mentioned locking hole 12'Hb.

Accordingly, the locking/unlocking mechanism for selectively locking or unlocking the receptacle 20 connected with the connector plug 34 relative to the installation table 10 and the locking mechanism fixing portion 12 includes the locking pin 30'Ra of the lock releasing button 30'R and the locking pin 30'La of the lock releasing button 30'L; the locking holes 12'Ha and 12'Hb; and the coil spring 31'.

Figure 20A:
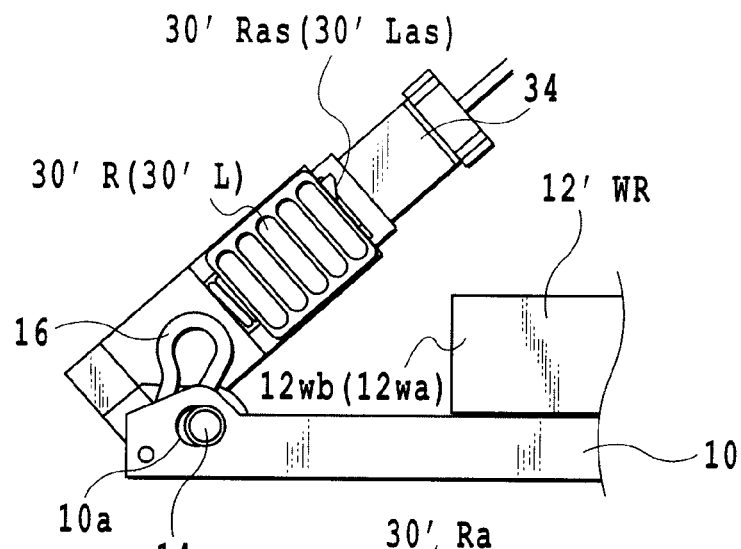
FIG. 20A is a view made available for illustrating the operation of the embodiment shown in FIG. 17.

In such a structure, when the receptacle 20 mounted with the connector plug 34 is in the locked state relative to the locking mechanism fixing portion 12', in the initial position illustrated in FIG. 20A, the end of the shaft 14 is located at one end of the hole 10a and the movable end 16B of the leaf spring 16 does not yet start its movement.

Figure 20B:
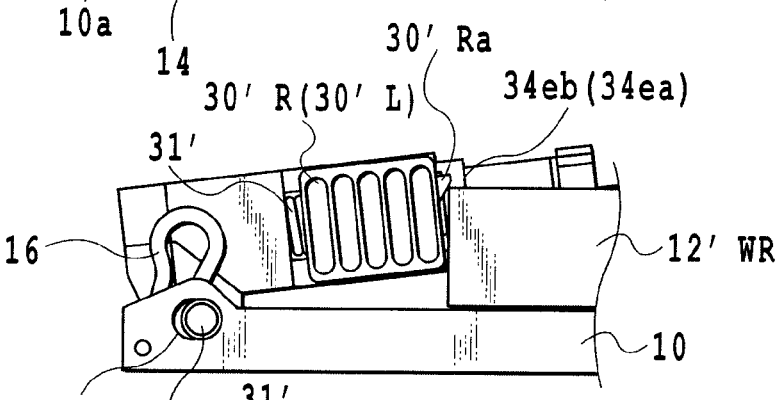
FIG. 20B is a view made available for illustrating the operation of the embodiment shown in FIG. 17.

Next, as shown in FIG. 20B, when the receptacle 20 is made to further rotate against the biasing force of the leaf spring 16, the pair of projections 34eb and 34ea formed opposed to the outer periphery of the connector plug 34 touch to the end surfaces 12'wb and 12'wa of the locking mechanism fixing portion 12'.

Figure 20C:
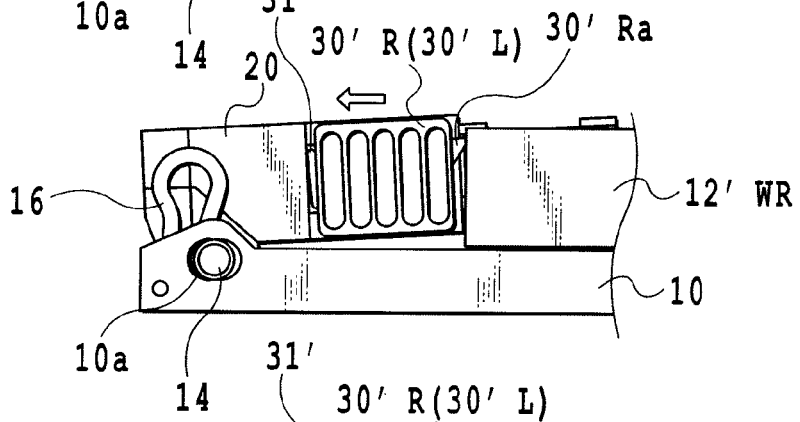
FIG. 20C is a view made available for illustrating the operation of the embodiment shown in FIG. 17.

Subsequently, when the receptacle 20 is further pressed and made to rotate against the biasing force of the leaf spring 16, as shown in FIG. 20C, the projections 34eb and 34ea are displaced downward while sliding on the end surface 12'wb and 12'wa of the locking mechanism fixing portion 12'. Since the coupling portions 20B and 20C of the receptacle 20 as well as the connector plug 34 are pressed against the biasing force of the leaf spring 16 at that time, the shaft 14 is apart from one end of the hole 10a and displaced toward the other end thereof in the direction as indicated by an arrow. The movable end 16B of the leaf spring 16 is also displaced in the direction indicated by an arrow in FIG. 20C. At that time, the locking pins 30'Ra and 30'La are pressed against the biasing force of the coil spring 31' while sliding the slants thereof.

Figure 20D:
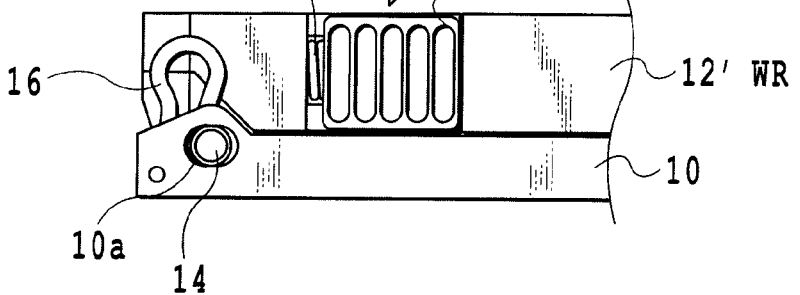
FIG. 20D is a view made available for illustrating the operation of the embodiment shown in FIG. 17.

And as shown FIG. 20D, when the receptacle 20 is in the locked state relative to the locking mechanism fixing portion 12', the shaft 14 touches to the other end of the hole 10a against the biasing force of the leaf spring 16. At that time, the locking pin 30'Ra and 30'La are pushed into the locking holes 12'Ha and 12'Hb, respectively, by the restoring force of the coil spring 31' and fit therewith.

Also, the pair of projections 34eb and 34ea touches to the end surfaces 12'wb and 12'wa of the locking mechanism fixing portion 12', and the connector plug 34 is pressed in a stable state via the receptacle 20 in the direction indicated by an arrow in FIG. 20D by the biasing force of the leaf spring 16. Thereby, the same operation and effect as those in the above-mentioned embodiment are obtainable.

Figure 21:
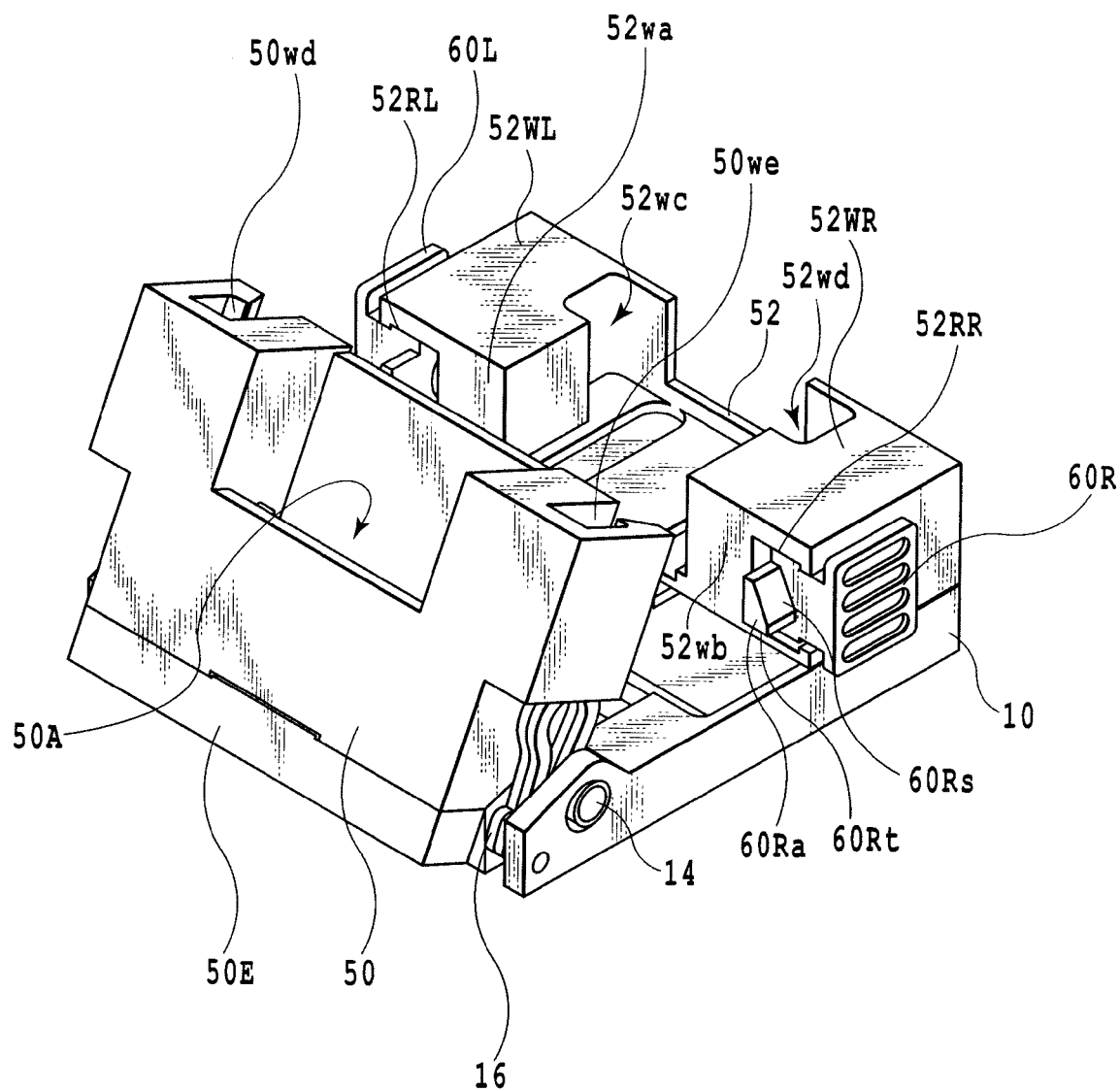
FIG. 21 is a perspective view illustrating a fourth embodiment of a releasable locking mechanism for an optical connector according to the present invention.
Figure 22:
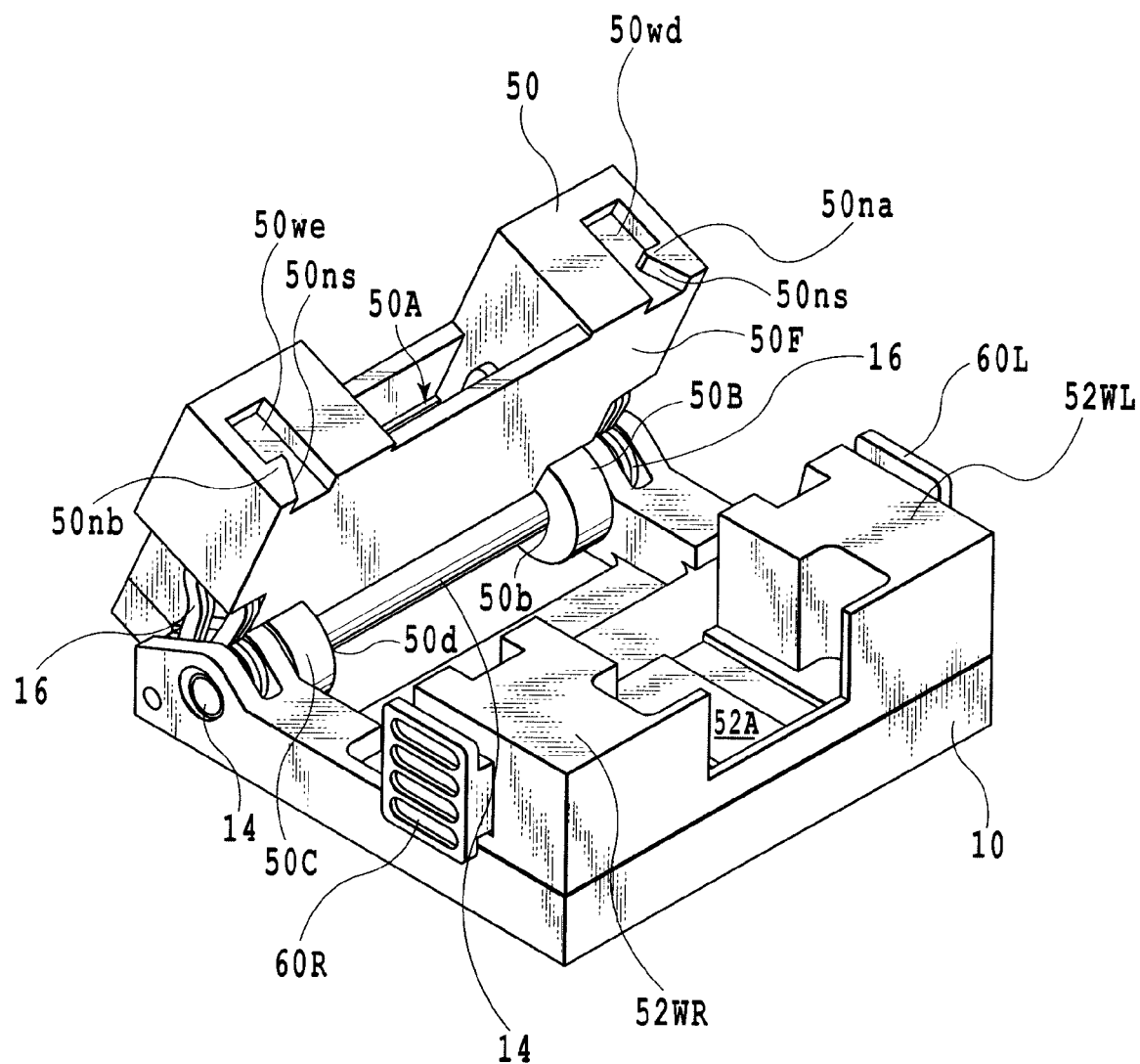
FIG. 22 is a perspective view of the embodiment shown in FIG. 21.

FIGS. 21 and 22 illustrate parts of the appearance of an optical connector, respectively, provided with a fourth embodiment of a releasable locking mechanism according to the present invention.

While the lock releasing buttons 30R and 30L are provided in the receptacle 20, and the locking nib receiving portions 12nb and 12na are provided in the locking mechanism fixing portion 12 opposite to each other, lock releasing buttons 60L and 60R are provided in a locking mechanism fixing portion 52, and locking nib receiving portions 50na and 50nb are provided in a receptacle 50 opposite to each other.

In FIG. 21, at an end of the installation table 10, a locking mechanism fixing portion 52 consisting of locking mechanism fixing walls 52WR and 52WL is fixed. Note, while the locking mechanism fixing portion 52 is formed separately from the installation table 10 in this embodiment, this is not limitative but the locking mechanism fixing portion 52 may be formed integral with the installation table 10.

The locking mechanism fixing wall 52WR and the locking mechanism fixing wall 52WL are formed opposite to each other while intervening with the communication path 52A between the both. On the wall surface of the locking mechanism fixing wall 52WR opposite to the communication path 52A, a recess 52wd is formed. In the recess 52wd, a projection at a rear end of the connector plug 34 described later is inserted at a predetermined gap between the both when the connector plug 34 is connected. Also, on an end surface 52wb as a position-restriction surface in the locking mechanism fixing wall 52WR opposed to the receptacle 50, a button accommodation portion 52RR is formed.

On the wall surface opposite to the communication path 52A, a recess 52wc is formed. When the connector plug 34 is connected, a projection opposed to the projection at the rear end of the above-mentioned connector plug 34 is inserted into the recess 52wc with a predetermined gap. Also, on an end surface 52wa as a position-restriction surface in the locking mechanism fixing wall 52WL opposed to the receptacle 50, a button accommodation portion 52RL is formed.

At an end of a wall forming the button accommodation portion 52RR opposed to the locking mechanism fixing portion 52WR and on a side of the end, an opening is formed, from which are projected a locking nib 60Ra of a lock releasing button 60R and an actuating part thereof. Also, at an end of a wall forming the button accommodation portion 52RL opposed to the locking mechanism fixing portion 52WL and on a side of the end, an opening is formed, from which are projected a locking nib 60La of a lock releasing button 60L and an actuating part thereof.

The lock releasing button 60R is disposed in the button accommodation portion 52RR along an axis of the shaft 14, that is, to be reciprocable generally perpendicular to a side of the installation table 10. Between a recess (not shown) at an end of the lock releasing button 60R and the inner periphery of the button accommodation portion 52RR, a coil spring 61 is disposed as a first biasing member for biasing the lock releasing button 60R. The lock releasing button 60R has a step engageable with the periphery of the opening from which is projected the actuating part thereof. By the engagement of a step arranged within the button accommodation portion 52RR with the periphery of the opening, the removal of the lock releasing button 60R and the predetermined displacement thereof are restricted.

Figure 23:
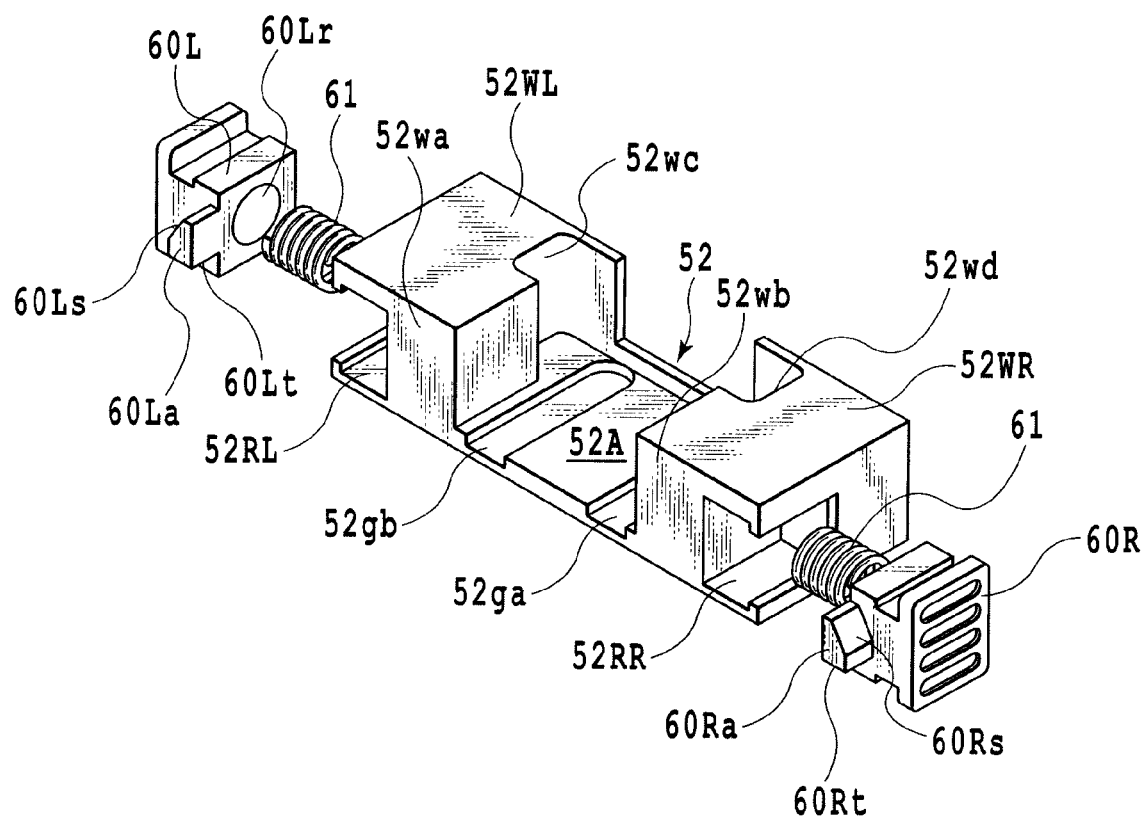
FIG. 23 is an exploded perspective view of constituent elements of the embodiment shown in FIG. 21.

As shown in FIG. 23, a slant 60Rs of the locking nib 60Ra in the lock releasing button 60R having a generally triangular prism shape is formed opposite to the slant 50ns of the locking nib receiving portion 50nb described later. Also, on one of other two sides intersecting with the slant 60Rs, an engagement surface 60Rt is formed, which is engaged with a retaining surface contiguous to the slant 50ns of the locking nib receiving portion 50ns, when the receptacle 50 is in a locked state.

The lock releasing button 60L is disposed in the button accommodation portion 52RL along an axis of the shaft 14, that is, to be reciprocable generally perpendicular to a side of the installation table 10. Between a recess 60Lr at an end of the lock releasing button 60L and the inner periphery of the button accommodation portion 52RL, a coil spring 61 is disposed as shown in FIG. 23 for biasing the lock releasing button 60L. The lock releasing button 60L has a step engageable with the periphery of the opening from which is projected the actuating part thereof. By the engagement of a step arranged within the button accommodation portion 52RL with the periphery of the opening, the removal of the lock releasing button 60L and the predetermined displacement thereof are restricted.

A slant 60Ls of the locking nib 60La in the lock releasing button 60L having a generally triangular prism shape is formed opposite to the slant 50ns of the locking nib receiving portion 50nb described later. Also, on one of other two sides intersecting with the slant 60Ls, an engagement surface 60Rt is formed, which is engaged with a retaining surface contiguous to the slant 50ns of the locking nib receiving portion 50ns when the receptacle 50 is in a locked state.

On the bottom of the communication path 52A, as shown in FIG. 23, grooves 52ga and 52gb into which are inserted the projections 34pb, respectively, are formed generally parallel to each other. Depths of the grooves 52ga and 52gb are of the same dimension capable of completely accommodating the projections 34pb.

As illustrated in FIGS. 21 and 22, the receptacle 50 mainly includes a rotary table 50F having coupling portions 20B and 20C coupled to the middle portion of the shaft 14, and an end cap 50E covering one end of the rotary table 50F.

The covering portions 50B and 50C formed on the lower surface of the rotary table 50F opposite to each other at a predetermined distance have holes 50b and 50d into which is inserted the middle portion of the shaft 14, respectively. Thereby, the receptacle 50 is held by the rotary table 50F and the shaft 14 to be rotatable relative to the installation table 10.

The rotary table 50F has a connector plug accommodation portion 50A for detachably accommodating and supporting the tubular portion 34CL of the connector plug 34 as a connecting portion. A structure of the connector plug accommodation portion 50A is the same as that of the above-mentioned connector plug accommodation portion 20A. Also, a structure of the end cap 50E is the same as that of the above-mentioned end cap 20E.

On opposite end surfaces of the connector plug accommodation portion 50A, recesses 50we and 50wd are formed, respectively.

On the wall surface forming the recess 50we, the locking nib receiving portion 50nb constituting part of the locking mechanism/unlocking mechanism is formed. For example, the hook-shaped locking nib receiving portion 50nb is formed to be vertical to the outer side surface thereof and project into the recess 50we. As shown in FIG. 22, a slant 50ns for guiding the above-mentioned locking nib 60Ra is formed in the locking nib receiving portion 50nb. A retaining surface formed above the locking nib receiving portion 50nb contiguous to the slant 50ns is generally vertical to the outer side surface thereof.

On the wall surface forming the recess 50wd, the locking nib receiving portion 50na constituting part of the locking mechanism/unlocking mechanism is formed. The locking nib receiving portion 50na is formed to be vertical to the outer side surface thereof and project into the recess 50wd. A slant 50ns for guiding the above-mentioned locking nib 60La is formed in the locking nib receiving portion 50na. A retaining surface formed above the locking nib receiving portion 50na contiguous to the slant 50ns is generally vertical to the outer side surface thereof.

In such a structure, when the receptacle 50 mounted with the connector plug 34 is locked to the locking mechanism fixing portion 52, first, the receptacle 50 is made to rotate against the biasing force of the leaf spring 16 toward the end surfaces 52wa and 52wb of the locking mechanism fixing portion 52.

Next, when the receptacle 50 is further made to rotate, the slants 60Rs and 60Ls of the locking nib 60Ra slide on the slants 50ns of locking nib receiving portions 50na and 50nb, respectively, whereby the locking nib 60Ra and the locking nib 60La are moved in the direction close to each other against the biasing force of the coil spring 61.

Subsequently, when the receptacle 50 is further pressed and made to rotate, whereby the locking nib 60Ra and the locking nib 60La are displaced to the predetermined maximum extent, the slant 50ns is pressed downward. Thereby, the engagement surfaces 60Rt and 60Lt of the locking nib 60Ra and the locking nib 60La are engaged with the retaining surfaces of the locking nib receiving portions 50na and 50nb, respectively, resulting in the locked state. At that time, since two projections 34pb of the connector plug 34 are inserted into the grooves 52ga and 52gb, the outer surface of the connector plug 34 touches to the bottom surface of the communication path 52A.

Accordingly, the displacement of the receptacle 50 mounted with the connector plug 34 is restricted in any direction in the above-mentioned locked state.

On the other hand, when the receptacle mounted with the connector plug 34 is changed from the locked state to the unlocked state relative to the locking mechanism fixing portion 52, first, the actuating part of the lock releasing button 60R and the actuating part of the lock releasing button 60L are pressed against the biasing force of the coil spring 61 in the mutually approaching direction. Thereby, the engagement surfaces 60Rt and 60Lt of the locking nib 60Ra and the locking nib 60La are disengaged from the retaining surfaces of the locking nib receiving portions 50na and 50nb, resulting in the unlocked state.

Thereafter, in a similar manner as in the above-mentioned embodiments, the receptacle 50 mounted with the connector plug 34 returns to the initial position by the biasing force of the leaf spring 16.

The invention claimed is:

1. A releasable locking mechanism for an optical connector comprising:
   a lock releasing button having a lock-fixing portion and movably disposed in either one of a receptacle or a base being disposed opposite to said receptacle, said receptacle having a connector plug accommodation portion for detachably accommodating a connector plug being connected to optical fibers to form a transmission path for photoelectric converted signals;
   a locking nib receiving portion formed opposite to said lock releasing button in either one of said receptacle or said base, for selectively fixing said lock-fixing portion to result in a locked state of said receptacle and said connector plug relative to said base;
   a first biasing member for biasing a locking nib of said lock releasing button in direction that fix it to said locking nib receiving portion;
   a position restricting surface for touching and holding an end of said connector plug mounted to said connector plug accommodation portion in said locked state, and
   a second biasing member for biasing said receptacle in the axial direction of said optical fibers when an end of said connector plug mounted to said connector plug accommodation portion is retained by said position restricting surface.

2. A releasable locking mechanism for an optical connector comprising:
   a lock releasing button having a lock-fixing portion and movably disposed in either one of a receptacle or a base disposed opposite to said receptacle, said receptacle having a connector plug accommodation portion for detachably accommodating a connector plug being connected to optical fibers to form a transmission path for photoelectric converted signals;
   a locking nib receiving portion formed opposite to said lock releasing button in either one of said receptacle or said base, for selectively fixing said lock-fixing portion to result in a locked state of said receptacle and said connector plug relative to said base,
   a first biasing member for biasing a locking nib of said lock releasing button in direction that fix it to said locking nib receiving portion;
   a position restricting member disposed in said base, for restricting the position of a predetermined end of said connector plug mounted to said connector plug accommodation portion when said connector plug mounted to said connector plug accommodation portion is in said locked state, and
   a second biasing member for biasing ends of said connector plug and said optical fibers toward the bottom of said connector plug accommodation portion in the axial direction of said optical fibers when the position of said end of said connector plug is restricted by said position restricting member.

3. The releasable locking mechanism for an optical connector as claimed in claim 1, wherein said receptacle is rotational movably supported relative to said base.

4. The releasable locking mechanism for an optical connector as claimed in claim 1, wherein said second biasing member is an elastic member for directly or indirectly pressing a shaft rotatably supporting said receptacle.

5. The releasable locking mechanism for an optical connector as claimed in claim 4, wherein said elastic member is a leaf spring made of metal or heat-resistant rubber.

6. The releasable locking mechanism for an optical connector as claimed in claim 2, wherein said second biasing member is a leaf spring having a pressing part in contact with an end of said connector plug and biasing the same.

7. The releasable locking mechanism for an optical connector as claimed in claim 1, wherein connecting end surfaces of said optical fibers touch to the bottom of said connector plug at a uniform pressure, when the end of said connector plug mounted to said connector plug accommodation portion touches to a position restricting surface and is held there.

8. The releasable locking mechanism for an optical connector as claimed in claim 6, wherein when a movable end of said leaf spring is supported by said shaft movably held in an ellipsoidal hole provided in said base, said connector plug is mounted in said connector plug accommodation portion as said receptacle is apart from said base,
   and said connecting ends of said optical fibers touch to the bottom of said connector plug accommodation portion at a uniform pressure based on the recovery force in accordance with the elastic displacements of the movable end of said leaf spring when said receptacle becomes horizontal relative to the surface of said base and the end of said connector plug mounted to said connector plug accommodation portion touches to a position restricting member formed on an end surface of said base and is held there.

9. The releasable locking mechanism for an optical connector as claimed in claim 6, wherein said lock releasing button and locking nib receiving portion are provided at two places, respectively.

10. The releasable locking mechanism for an optical connector as claimed in claim 7, wherein said receptacle is separable from said base and said connector plug is detachable from said connector plug accommodation portion when said locking nib is released from said locking nib receiving portion by pressing said lock releasing button against the biasing force of said first biasing member.

11. The releasable locking mechanism for an optical connector as claimed in claim 9, wherein the bottom of said connector plug accommodation portion in said receptacle is constituted by a transparent thin plate member provided with a micro-lens touching at a predetermined pressure to the end surface of said optical fiber projected through a micro-hole formed in said connector plug, whereby the output of optical signals from said optical fiber to outside or the input of optical signals from outside to said optical fiber is possible.

12. The releasable locking mechanism for an optical connector as claimed in claim 10, wherein said connector plug is provided with a ferrule into which are embedded said optical fibers, wherein the end surfaces of said optical fibers coincide with the end surface of said ferrule.

13. The releasable locking mechanism for an optical connector as claimed in claim 1, wherein said base has a means for dissipating heat.

14. The releasable locking mechanism for an optical connector as claimed in claim 2, wherein said receptacle is rotational movably supported relative to said base.

15. The releasable locking mechanism for an optical connector as claimed in claim 2, wherein said base has a means for dissipating heat.

* * * * *